US012644712B2

(12) United States Patent
Kabalar et al.

(10) Patent No.: US 12,644,712 B2
(45) Date of Patent: Jun. 2, 2026

(54) CLOUD BASED MULTI VEHICLE PATH PLANNER

(71) Applicant: QUALCOMM Incorporated, San Diego, CA (US)

(72) Inventors: Julia Kabalar, Munich (DE); Dorel Mircea Coman, Munich (DE); Nirnai Ach, Munich (DE); Mireille Lucette Laure Gregoire, Stuttgart (DE); Camille Maurice, Munich (DE); Kiran Bangalore Ravi, Paris (FR); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 18/404,625

(22) Filed: Jan. 4, 2024

(65) Prior Publication Data

US 2025/0224236 A1 Jul. 10, 2025

(51) Int. Cl.
*G01C 21/28* (2006.01)
*G06V 10/94* (2022.01)
*G06V 20/58* (2022.01)

(52) U.S. Cl.
CPC ............. *G01C 21/28* (2013.01); *G06V 10/95* (2022.01); *G06V 20/58* (2022.01)

(58) Field of Classification Search
CPC ......... G01C 21/28; G06V 20/58; G06V 10/95
See application file for complete search history.

(56) References Cited

U.S. PATENT DOCUMENTS

| 10,966,069 | B1 | | 3/2021 | Liu et al. | |
| 11,269,356 | B2 | | 3/2022 | Rakshit et al. | |
| 11,520,331 | B2 | | 12/2022 | Baghsorkhi et al. | |
| 11,566,912 | B1 | * | 1/2023 | Arnicar | G08G 1/0129 |
| 2021/0110716 | A1 | * | 4/2021 | Becker | B60W 30/085 |
| 2021/0112094 | A1 | * | 4/2021 | Liu | H04W 12/121 |
| 2021/0197720 | A1 | * | 7/2021 | Houston | G06V 10/764 |
| 2021/0254983 | A1 | * | 8/2021 | Wheeler | G05D 1/0214 |
| 2022/0319337 | A1 | | 10/2022 | Plascencia-Vega et al. | |
| 2023/0020966 | A1 | * | 1/2023 | Foster | B60W 60/0015 |
| 2023/0322259 | A1 | * | 10/2023 | Sadek | G01C 21/32 701/23 |
| 2024/0296583 | A1 | * | 9/2024 | Kulp | G06T 7/73 |
| 2025/0180361 | A1 | * | 6/2025 | Hsu | G06T 7/73 |

OTHER PUBLICATIONS

International Search Report and Written Opinion—PCT/US2024/059579—ISA/EPO—Mar. 20, 2025.

* cited by examiner

*Primary Examiner* — Nicholas Augustine
(74) *Attorney, Agent, or Firm* — Thien T. Nguyen

(57) ABSTRACT

Aspects presented herein relate to perception data collection and curation. In one aspect, a network entity receives, from a first set of user equipments (UEs), a first set of perception data collected by the first set of UEs. The network entity configures, for a second set of UEs based on the first set of perception data, at least one of: a set of planned routes and time plans for collecting a second set of perception data or a set of embeddings centroids. The network entity receives, from the second set of UEs, the second set of perception data based on at least one of the configured set of planned routes and time plans or the configured set of embeddings centroids.

30 Claims, 17 Drawing Sheets

900C

Destination

Planned/Proposed Trajectory 906

910
Collect perception data

Navigation route 908 of the vehicle 904

Vehicle 904

Actual route travelled by the vehicle 904

Figures 9A, 9B, 9C:
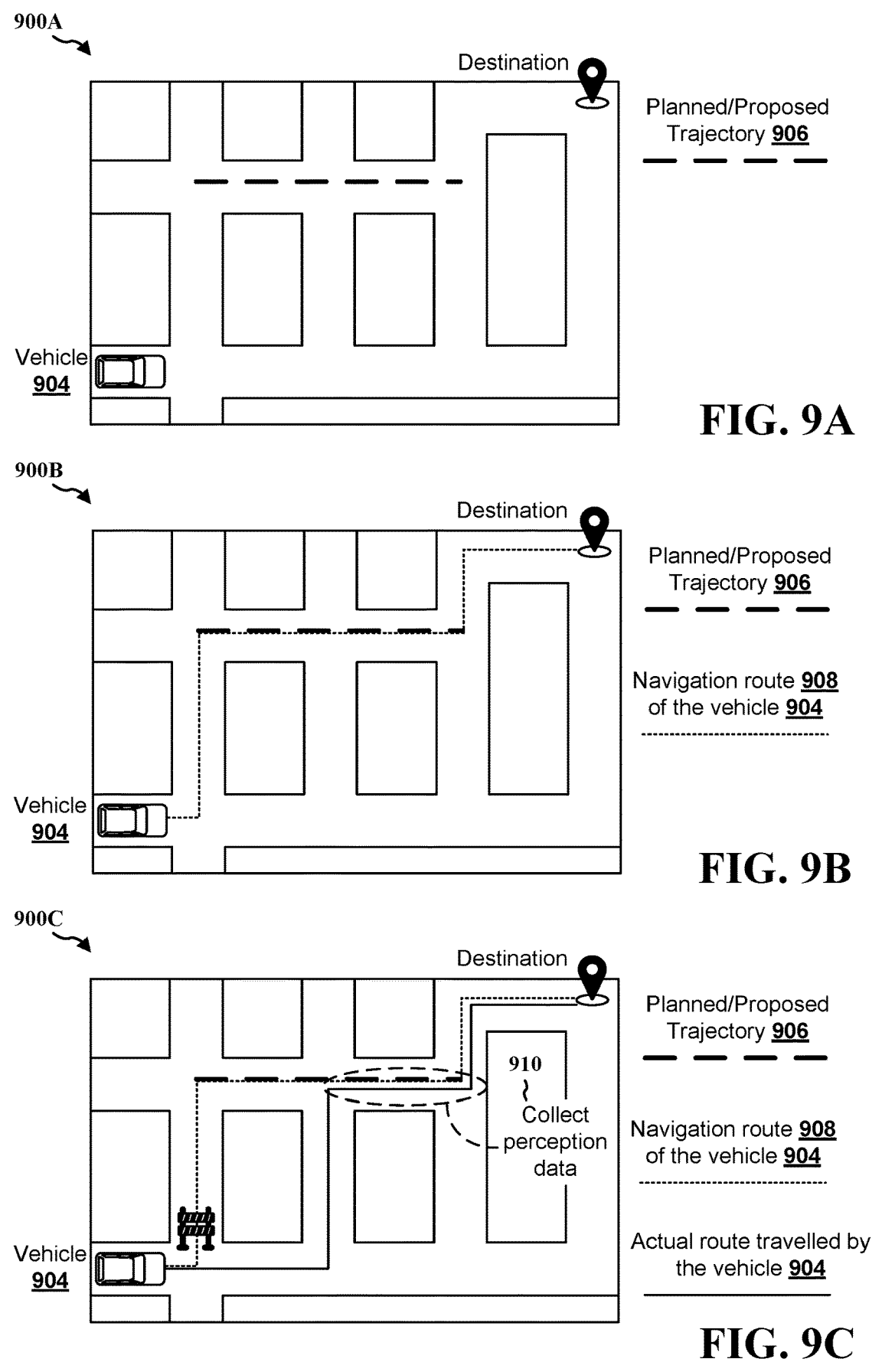

Destination

Planned/Proposed
Trajectory 906

Vehicle
904

Destination

Planned/Proposed
Trajectory 906

Navigation route 908
of the vehicle 904

Vehicle
904

Destination

910

Collect
perception
data

Planned/Proposed
Trajectory 906

Navigation route 908
of the vehicle 904

Actual route travelled by
the vehicle 904

Vehicle
904

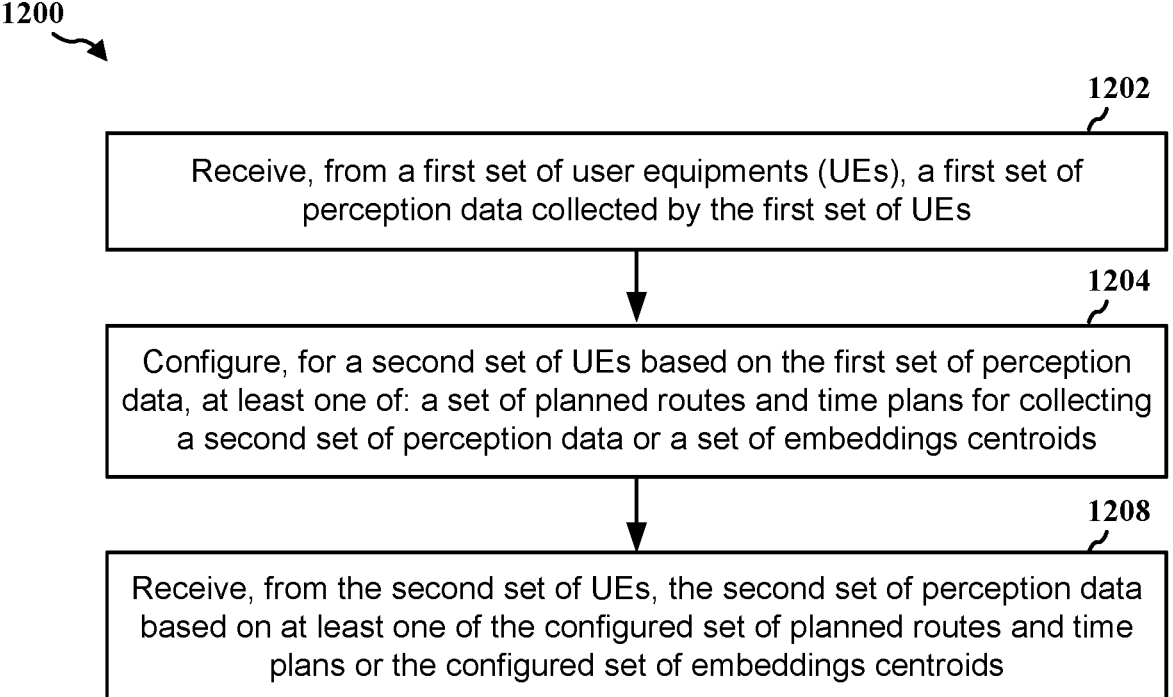

1202

Receive, from a first set of user equipments (UEs), a first set of perception data collected by the first set of UEs

1204

Configure, for a second set of UEs based on the first set of perception data, at least one of: a set of planned routes and time plans for collecting a second set of perception data or a set of embeddings centroids

1208

Receive, from the second set of UEs, the second set of perception data based on at least one of the configured set of planned routes and time plans or the configured set of embeddings centroids

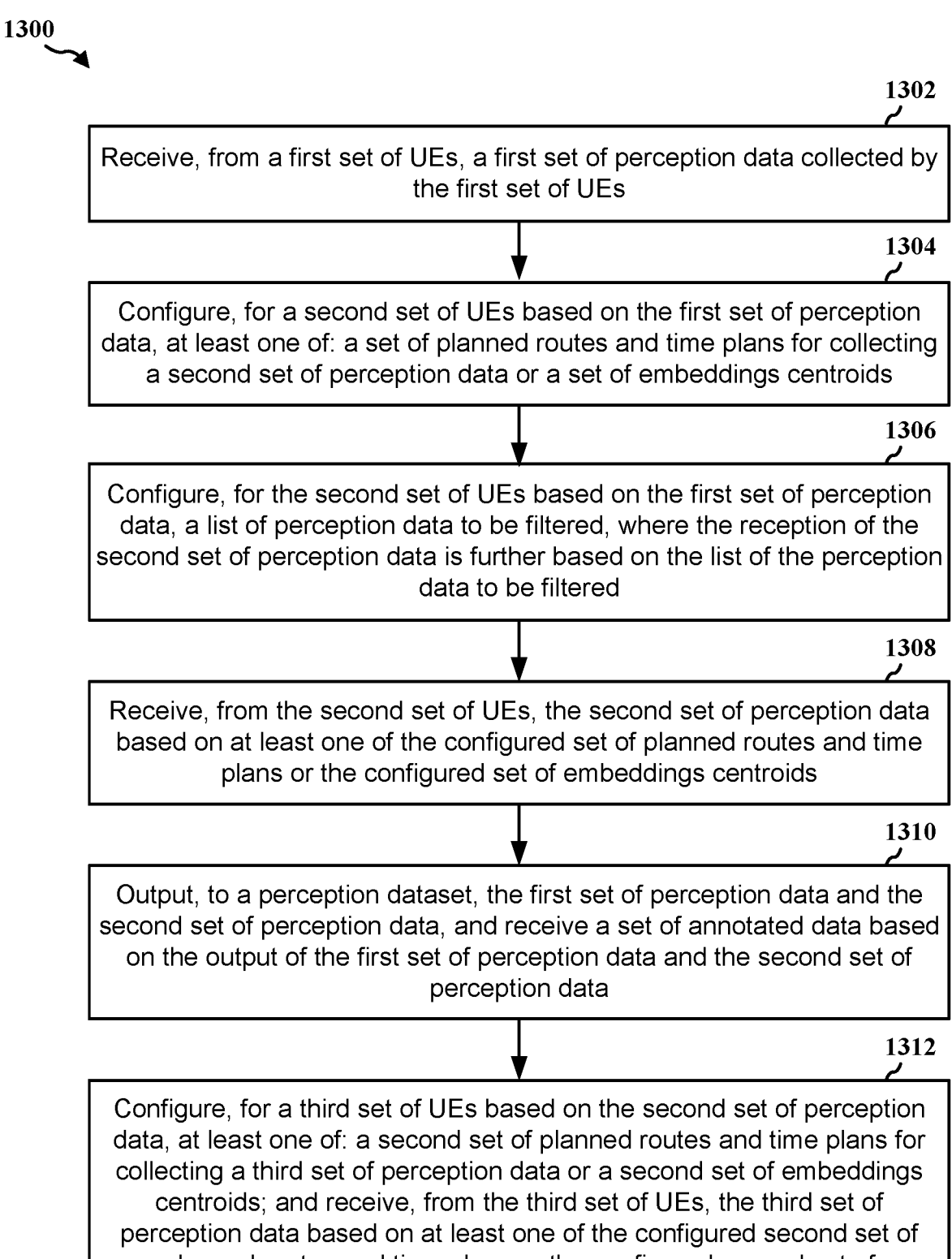

1302

Receive, from a first set of UEs, a first set of perception data collected by the first set of UEs

1304

Configure, for a second set of UEs based on the first set of perception data, at least one of: a set of planned routes and time plans for collecting a second set of perception data or a set of embeddings centroids

1306

Configure, for the second set of UEs based on the first set of perception data, a list of perception data to be filtered, where the reception of the second set of perception data is further based on the list of the perception data to be filtered

1308

Receive, from the second set of UEs, the second set of perception data based on at least one of the configured set of planned routes and time plans or the configured set of embeddings centroids

1310

Output, to a perception dataset, the first set of perception data and the second set of perception data, and receive a set of annotated data based on the output of the first set of perception data and the second set of perception data

1312

Configure, for a third set of UEs based on the second set of perception data, at least one of: a second set of planned routes and time plans for collecting a third set of perception data or a second set of embeddings centroids; and receive, from the third set of UEs, the third set of perception data based on at least one of the configured second set of planned routes and time plans or the configured second set of embeddings centroids

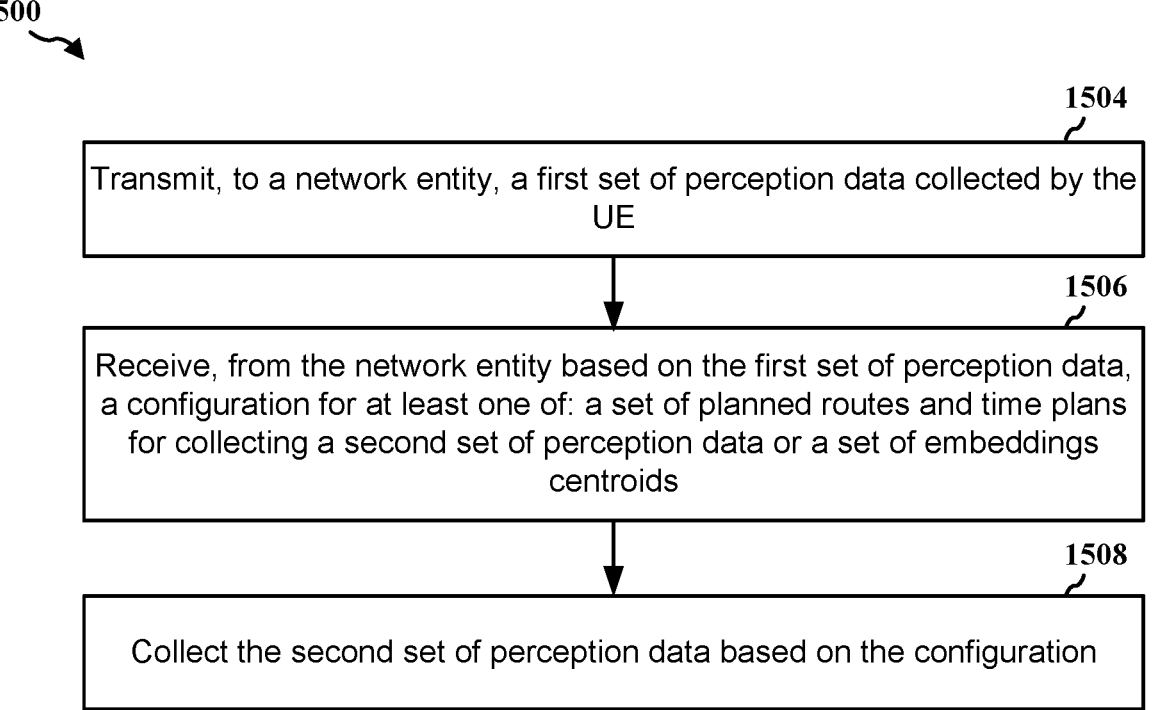

1504

Transmit, to a network entity, a first set of perception data collected by the UE

1506

Receive, from the network entity based on the first set of perception data, a configuration for at least one of: a set of planned routes and time plans for collecting a second set of perception data or a set of embeddings centroids

1508

Collect the second set of perception data based on the configuration

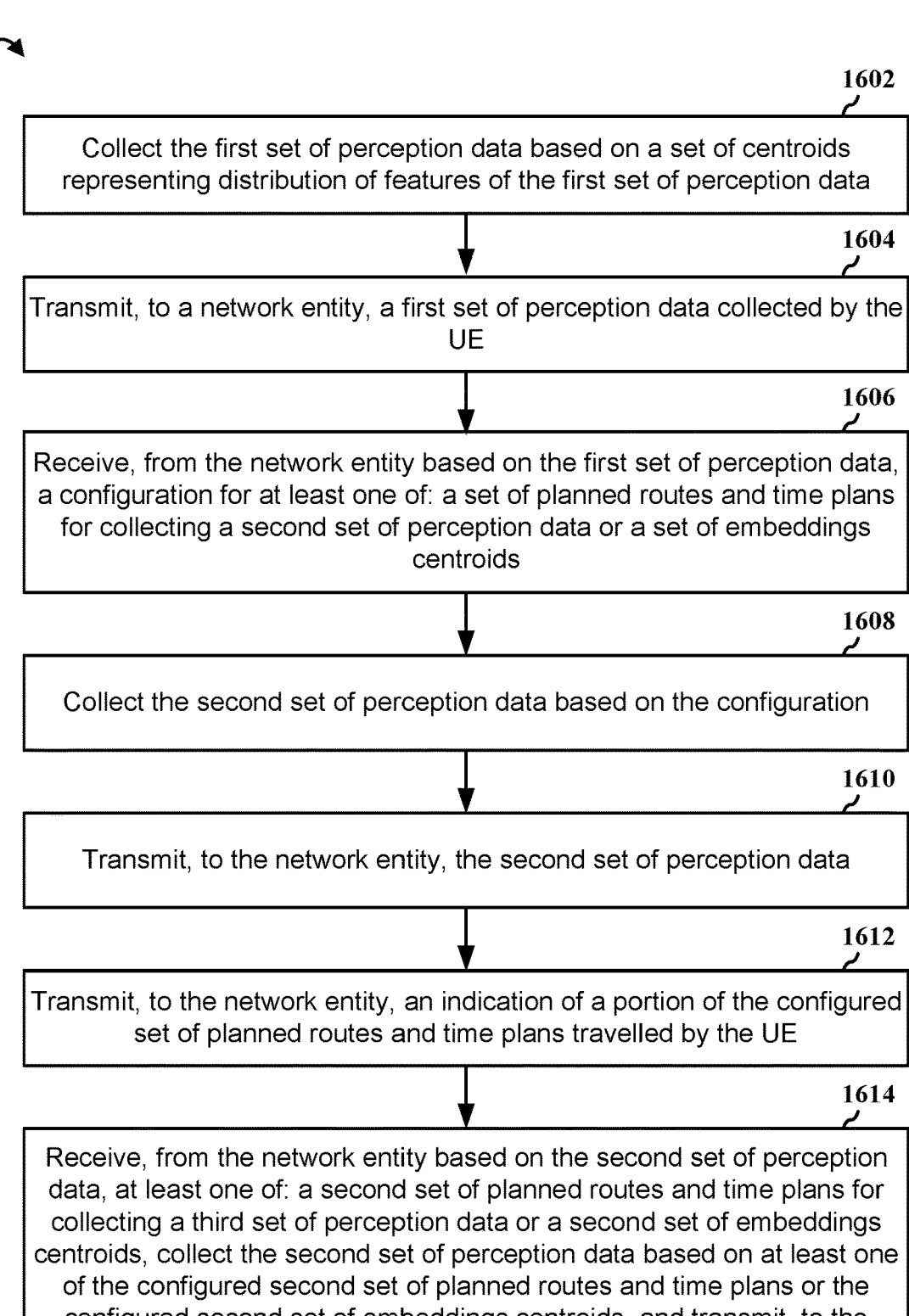

1602

Collect the first set of perception data based on a set of centroids representing distribution of features of the first set of perception data

1604

Transmit, to a network entity, a first set of perception data collected by the UE

1606

Receive, from the network entity based on the first set of perception data, a configuration for at least one of: a set of planned routes and time plans for collecting a second set of perception data or a set of embeddings centroids

1608

Collect the second set of perception data based on the configuration

1610

Transmit, to the network entity, the second set of perception data

1612

Transmit, to the network entity, an indication of a portion of the configured set of planned routes and time plans travelled by the UE

1614

Receive, from the network entity based on the second set of perception data, at least one of: a second set of planned routes and time plans for collecting a third set of perception data or a second set of embeddings centroids, collect the second set of perception data based on at least one of the configured second set of planned routes and time plans or the configured second set of embeddings centroids, and transmit, to the network entity, the third set of perception data

FIG. 16

CLOUD BASED MULTI VEHICLE PATH PLANNER

TECHNICAL FIELD

The present disclosure relates generally to communication systems, and more particularly, to wireless communication involving data collection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a first set of user equipments (UEs), a first set of perception data collected by the first set of UEs. The apparatus configures, for a second set of UEs based on the first set of perception data, at least one of: a set of planned routes and time plans for collecting a second set of perception data or a set of embeddings centroids. The apparatus receives, from the second set of UEs, the second set of perception data based on at least one of the configured set of planned routes and time plans or the configured set of embeddings centroids.

In an aspect of the disclosure, a method, a computer-readable medium, and an apparatus are provided. The apparatus transmits, to a network entity, a first set of perception data collected by the UE. The apparatus receives, from the network entity based on the first set of perception data, a configuration for at least one of: a set of planned routes and time plans for collecting a second set of perception data or a set of embeddings centroids. The apparatus collects the second set of perception data based on the configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a diagram illustrating an example embeddings centroids allocator in accordance with various aspects of the present disclosure.

FIG. 9A is a diagram illustrating an example of a vehicle collecting perception data based on a planned/proposed trajectory in accordance with various aspects of the present disclosure.

FIG. 9B is a diagram illustrating an example of a vehicle collecting perception data based on a planned/proposed trajectory in accordance with various aspects of the present disclosure.

FIG. 9C is a diagram illustrating an example of a vehicle collecting perception data based on a planned/proposed trajectory in accordance with various aspects of the present disclosure.

FIG. 12 is a flowchart of a method of wireless communication.

FIG. 13 is a flowchart of a method of wireless communication.

FIG. 15 is a flowchart of a method of wireless communication.

FIG. 16 is a flowchart of a method of wireless communication.

DETAILED DESCRIPTION

Figure 1:
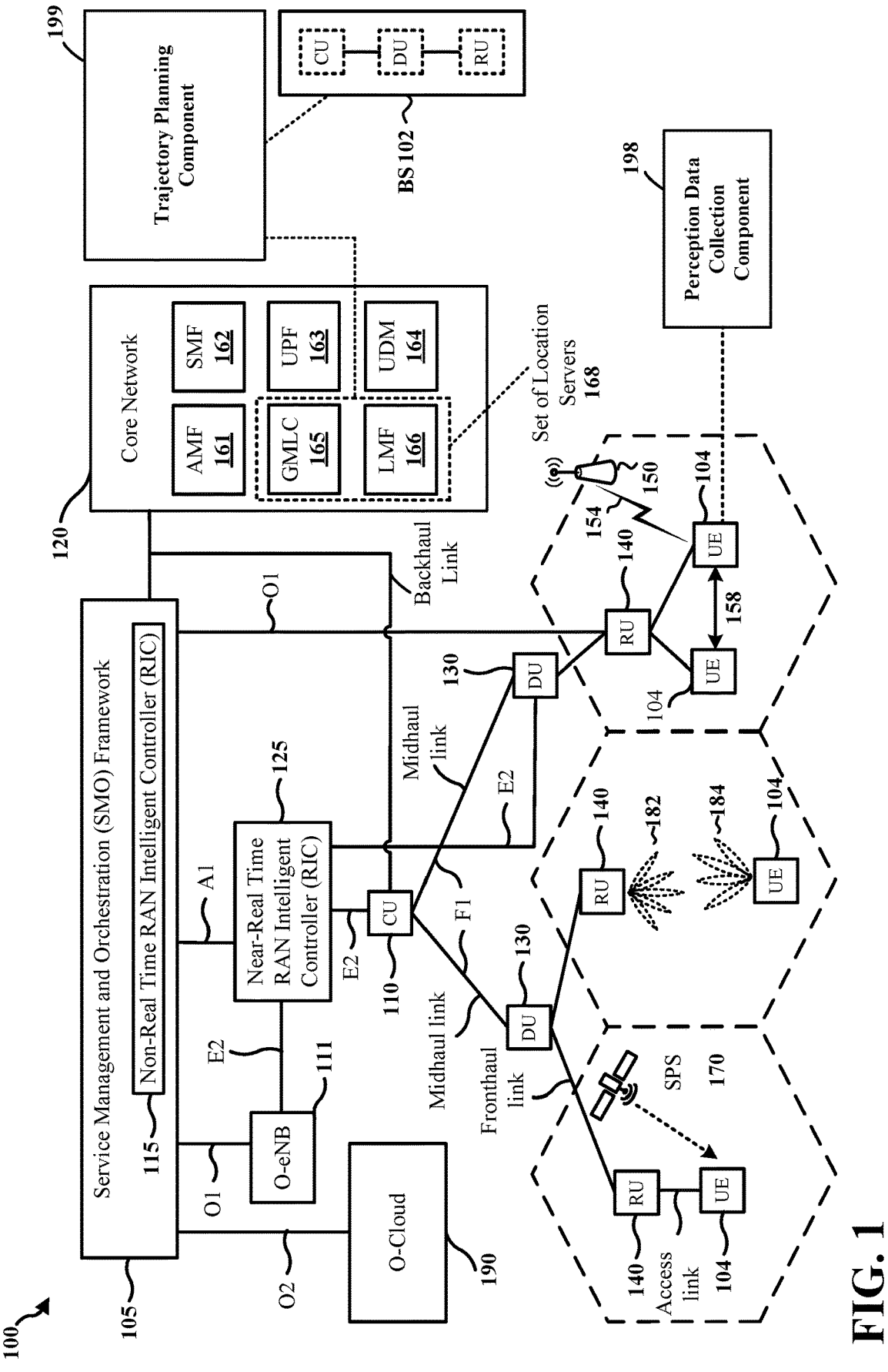
FIG. 1 is a diagram illustrating an example of a wireless communications system and an access network.

Aspects presented herein may improve the efficiency of perception data collection and curation, thereby improving the overall performance of machine learning (ML)/neural network (NN) model training (e.g., for autonomous/assisted driving systems) based on the perception data. Autonomous perception data may specify large amounts of multisensory perception data to be collected across multiple countries, conditions, and scenarios. This may involve a data collection process and a data curation process. As of today, data collection and data curation (dataset design) are independent steps and hence, generate very often redundant, non-diverse data. Aspects presented herein provide an optimal cloud-based solution for collecting and optimizing data for path planning. Data collected from a vehicle pool globally are configured to be uploaded to a cloud-based centralized entity for processing and optimization. Aspects presented herein may include the following aspects/features: online file selector, embedding store, trajectory store, attribute store, high-definition (HD) maps, online distribution allocator, embeddings centroids allocator, online path planner, etc.

Aspects presented herein provide a generic method that is capable of simultaneously satisfying evolving perception specifications and mission-specific specifications and logistic costs in an online setup and uses the cloud to enhance the data collection and selection step over multiple vehicles. An online path planner may be configured to plan optimal trajectories over multiple vehicles to satisfy the desired data distributions and geographical separation constraints. An online file selector may be configured to pick the most diverse and most informative multi-model perception data for training of convolutional neural network (CNN)/deep neural network (DNN) models for various autonomous driving perception tasks.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF)

163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, one or more components or a computing platform/device implemented in a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a perception data collection component 198 that may be configured to transmit, to a network entity, a first set of perception data collected by the UE; receive, from the network entity based on the first set of perception data, a configuration for at least one of: a set of planned routes and time plans for collecting a second set of perception data or a set of embeddings centroids; and collect the second set of perception data based on the configuration. In certain aspects, the base station 102 or the one or more location servers 168 may have a trajectory planning component 199 that may be configured to receive, from a first set of user equipments (UEs), a first set of perception data collected by the first set of UEs; configure, for a second set of UEs based on the first set of perception data, at least one of: a set of planned routes and time plans for collecting a second set of perception data or a set of embeddings centroids; and receive, from the second set of UEs, the second set of perception data based on at least one of the configured set of planned routes and time plans or the configured set of embeddings centroids.

Figures 2A, 2B, 2C, 2D:
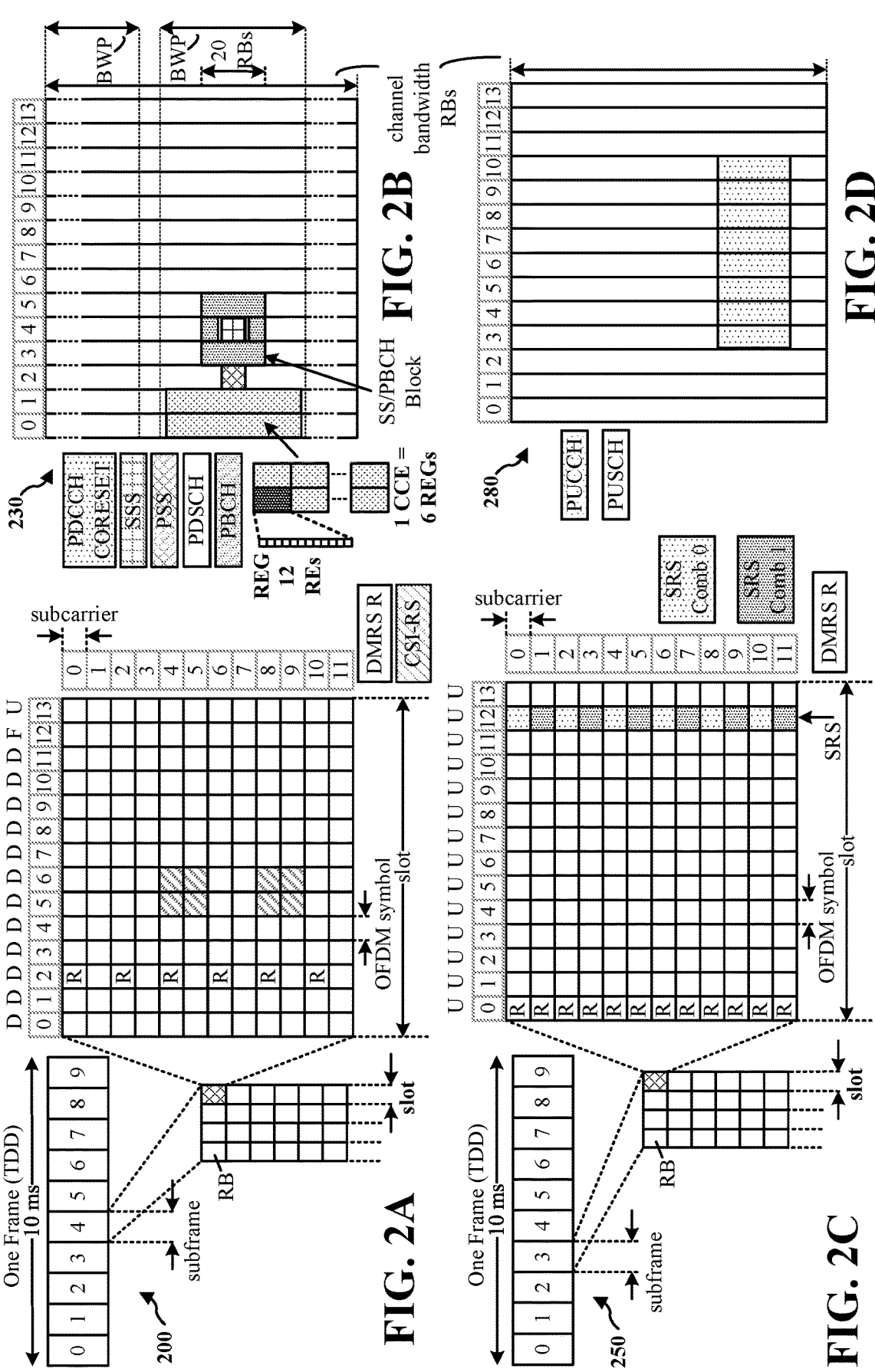
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^{\mu} \cdot 15$[KHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
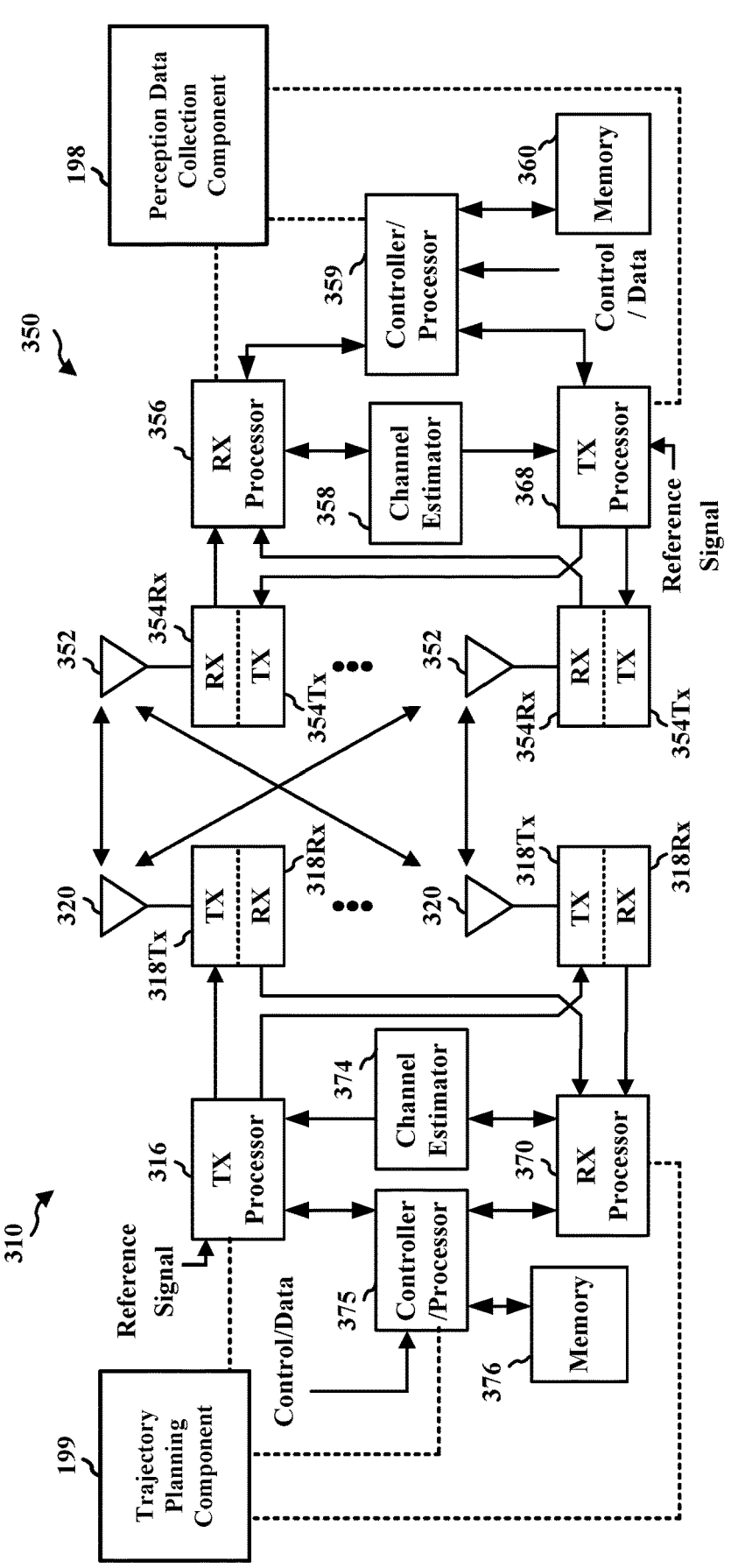
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the perception data collection component 198 of FIG. 1.

At least one of the TX processor 316, the RX processor 370, and the controller/processor 375 may be configured to perform aspects in connection with the trajectory planning component 199 of FIG. 1.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), such as camera(s), radar(s), light detection and ranging (lidar(s) or lidar sensor(s)), etc., and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving, which may also be called as self-driving or driverless technology, may refer to the ability of a vehicle to navigate and operate itself without specifying human intervention (e.g., travelling from one place to another place without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and ADAS. In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

To enable a vehicle to be capable of providing assisted driving and/or autonomous driving, the vehicle may be configured to use various machine learning (ML) and/or neural network (NN) frameworks. An ML/NN framework may refer to a set of tools, libraries, and/or software components that are configured to provide a structured way to design, build, and deploy ML/NN models and applications. These frameworks may be able to simplify the process of developing ML/NN algorithms and applications by providing a foundation of pre-built functions, algorithms, and utilities. They may typically include features for data preprocessing, model training, evaluation, and/or deployment, etc. ML/NN frameworks may come in various programming languages, and they may be configured to cater to different types of machine learning tasks, including supervised learning, unsupervised learning, and/or reinforcement learning, etc. An ML/NN model may refer to a mathematical representation of a real-world process or problem, created using ML/NN algorithms and techniques. These ML/NN models may be configured to make predictions, classify data, and/or solve specific tasks based on patterns and relationships learned from input data. A deep learning framework may refer to a specialized software library or toolset that provides specified components and abstractions for building, training, and deploying deep neural networks. Deep learning frameworks may be designed to facilitate the development of complex neural network models, especially deep neural networks with multiple layers. These frameworks may offer a wide range of pre-implemented layers, optimizers, loss functions, and other components, making it easier for researchers and developers to work with deep learning models.

Figure 4:
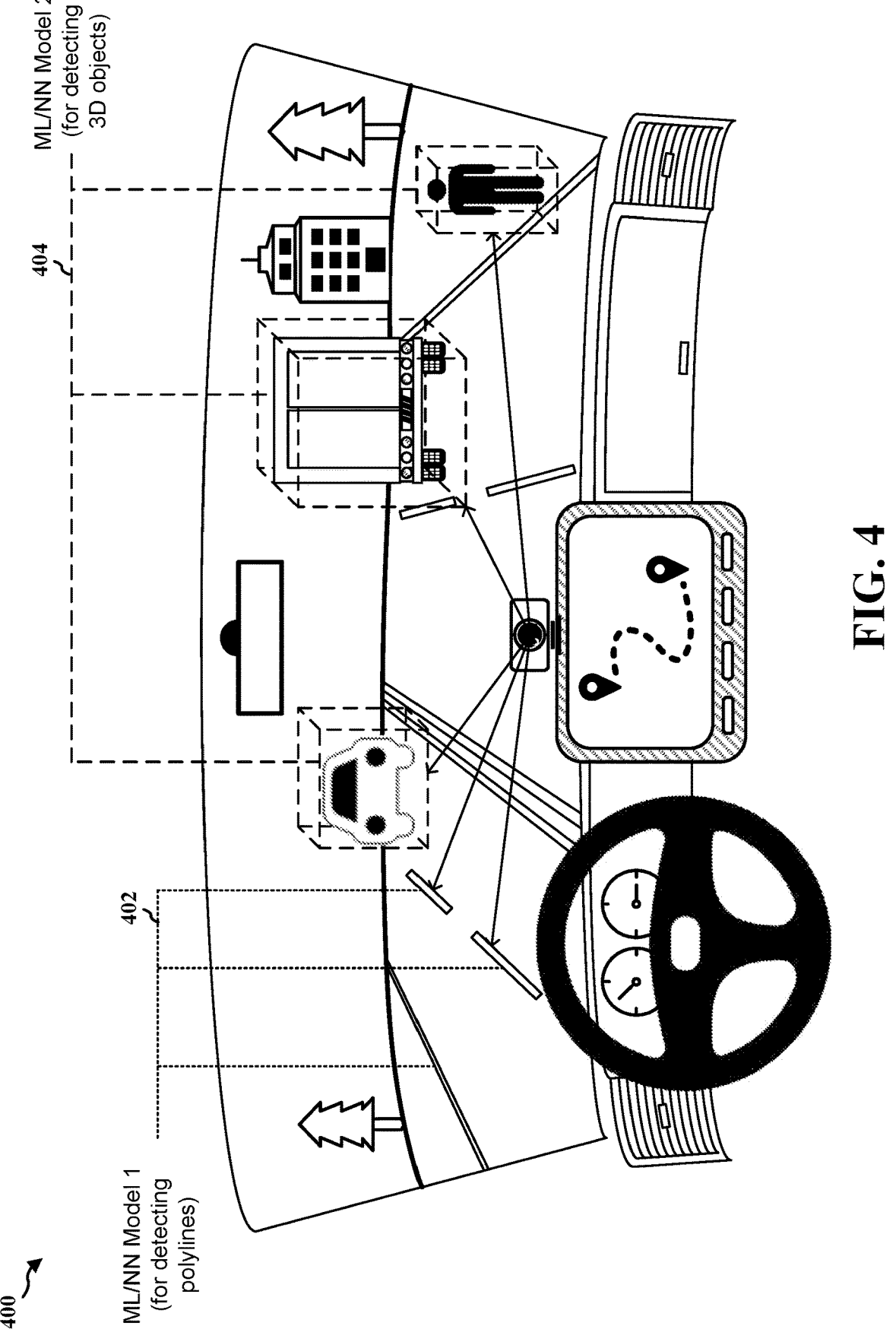
FIG. 4 is a diagram illustrating an example of utilizing machine learning (ML)/neural network (NN) model(s) for road object detections in accordance with various aspects of the present disclosure.

FIG. 4 is a diagram 400 illustrating an example of utilizing ML/NN model(s) for road object detections in accordance with various aspects of the present disclosure. In some implementations, an ADAS or an autonomous driving system may be configured to perform object detections using one or more ML/NN models. For example, as shown at 402, a first ML/NN model (ML/NN Model 1) may be trained/used to detect and track polylines from sensor output(s) (e.g., images captured by the camera(s) of the vehicle, point clouds generated from radar(s)/lidar(s), etc.), while a second ML/NN model (ML/NN Model 2) may be trained/used to detect and track objects in a three-dimensional (3D) space (e.g., to perform 3D object detection (3DOD) tasks), such as shown at 404. Then, the outputs of these two ML/NN models may be processed and used by the ADAS or the autonomous driving system (e.g., for assisted/autonomous driving). In some implementations, an ML/NN model may also be configured to perform multiple types of object detections (e.g., to perform both the polyline detection and the 3D object detection). A point cloud may refer to a discrete set of data points in space, where these points may represent a 3D shape or object. In some implementations, each point position may be associated with a set of Cartesian coordinates (X, Y, Z). Point clouds may be produced by radar(s)/lidar(s) by detecting multiple points on the external surfaces of objects.

For purposes of the present disclosure, "perception data" or "autonomous perception data" may refer to the information gathered by a vehicle's sensor(s) and system(s) to understand and interpret its surroundings (e.g., for purposes of providing assisted/autonomous driving). For example, autonomous vehicles may be configured to rely on various sensors to perceive the environment and make informed decisions. These sensors may typically include one or more of: (1) lidar(s)/lidar sensor(s) which use laser beams to measure distances and create detailed 3D maps of the environment, (2) radar(s) which use radio waves to detect the presence, distance, and speed of objects around the vehicle, (3) camera(s) which capture visual data, allowing the vehicle to identify and recognize objects, road signs, lane markings, and other important visual cues, (4) ultrasonic sensors which use sound waves to detect objects in close proximity to the vehicle, (5) Global Navigation Satellite System (GNSS) which provides information about the vehicle's location, speed, and heading, contributing to overall situational awareness, and/or (6) inertial measurement unit(s) IMU(s) which measure the vehicle's acceleration and angular rate, helping to determine its position and orientation, etc. These sensors may collectively gather data about the vehicle's surroundings and create a comprehensive perception system. Then, a set of software algorithms may be implemented to analyze and interpret this perception data to make decisions, such as navigating the vehicle, avoiding obstacles, following traffic rules, and ensuring overall safety, etc. Perception data may be an important component of a sensor fusion process, where information from different sensors is combined to create a more accurate and reliable representation of the environment for the autonomous vehicle.

In some implementations, autonomous perception data may specify a large amount of multisensory perception data (e.g., referring to perception data obtained from multiple/various sensors) to be collected across multiple countries, conditions, and/or scenarios. As such, for data collection, logistics and energy constraints may be factors to be considered during data collection design. For example, a vendor may desire to reduce the number of kilometers/miles driven and the energy footprint for its overall system (e.g., the data collection system) and design it efficiently. Data collection planners may specify a convenient system to plan and track the data collectors' (e.g., vehicles collecting data) statuses including the data coverage and road objects collected. Data collection may also be specified to change adaptively based on data select step and provide new planned missions to collect data in new scenarios, geographical regions, and/or perception tasks, etc. In some examples, data collection may be configured to be an open loop system where collected data may not meet customer specifications, data diversity, and/or annotation specifications, and may not build a good dataset to train perception (ML/NN) models (e.g., 3DOD, polylines, lanes, segmentation, etc.).

After perception data is collected, the perception data may be curated, which may be referred to as the "data curation." Data curation is a process of systematically collecting, organizing, validating, and managing data to ensure its quality, relevance, and suitability for training and deploying ML/NN models. Data curation may involve preparing and maintaining a high-quality dataset that is specified (e.g., important) for the success of ML/NN projects. The goal of data curation may be to enhance the overall performance, accuracy, and reliability of ML/NN models by providing them with a clean and representative dataset. As such, data curation may be a key intermediate step that provides feedback to data collection and measures feasibility of samples for dataset creation. For example, data curation may enable/allow the generation of optimal datasets (e.g., optimal with regards to data diversity, reduction of similar samples, reduction of amount of data for annotation, pick more relevant samples according to objective(s)/mission(s)).

In typical data collection and curation implementations, data collection and data curation (or dataset design) may be configured to be independent steps and hence, may often generate redundant and non-diverse data. In addition, storing perception data collected from a large number of vehicles may be costly, and there may be no generic method/process available to simultaneously satisfy both evolving dataset specifications and evolving constraints in cost for data collection and curation. Even after deployment of perception systems in vehicles, perception data may be specified to be continuously mined (e.g., by the vehicles) for improvement in perception. For example, a typical perception data collection system may specify large amounts of multi-modal (camera/lidar) data to be collected across multiple vehicles (e.g., K different vehicles), and then the perception data collection system may use subsequent ingestion processes and rely on heavy data curation processes in a later step to reduce the dataset to fulfill/meet certain goals.

Aspects presented herein may improve the efficiency of perception data collection and curation, thereby improving the overall performance of ML/NN model training (e.g., for autonomous/assisted driving systems) based on the perception data. Aspects presented herein may provide a mechanism that is capable of effectively rejecting samples (e.g., specified types of perception data collected) to reduce the cost of data storage, improving data diversity (e.g., geographically, scenario wise), and/or avoiding redundant samples (e.g., similar samples collected at different time (during temporally daytime/night-time), at different places (urban/highway/rural), and/or under different environmental conditions (weather and lighting conditions), etc.), which may be beneficial to perception data collection and curation. For example, in one aspect of the present disclosure, a network entity (e.g., a data collection server, a centralized server/store, etc.) may have the capability to configure a set of UEs (e.g., a set of vehicles, a set of data collectors, etc.) to select samples (e.g., perception data, embeddings, etc.) optimally online from the perception data collected by the set of UEs locally to satisfy a set of global collection criteria (e.g., dataset/mission specifications, cost specifications, storage, vehicle deployment, logistics costs, etc.). Aspects presented herein also provide a multi-sensor perception data curation pipeline, which includes a multi-vehicle collection setup with large data bandwidth due to a large sensor set and intense data collection with iterations across countries, a vehicle-to-cloud based distributed data curation pipeline, and a collaborative online file selection for vehicle pool.

Figure 5:
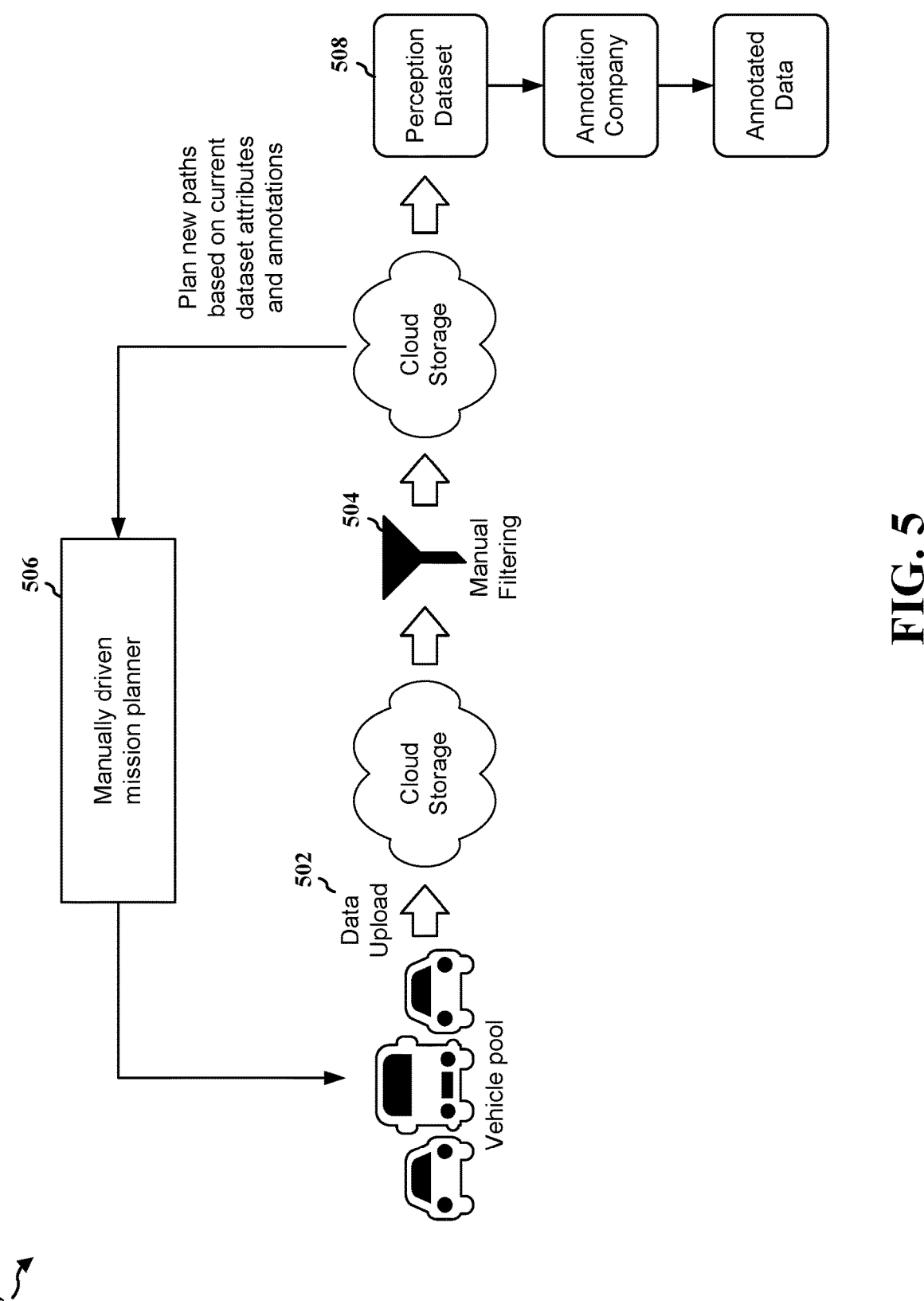
FIG. 5 is a diagram illustrating an example of data collection and curation in accordance with various aspects of the present disclosure.

FIG. 5 is a diagram 500 illustrating an example of data collection and curation in accordance with various aspects of the present disclosure. As shown at 502, a server (e.g., a perception data collection server, a cloud storage, etc.) may be configured to receive perception data collected by a set of vehicles (which may be referred to as a vehicle pool). For example, each vehicle in the vehicle pool may receive information in a heuristic manual way (e.g., as shown at 506) to decide where to collect the perception data and what to collect (e.g., what types of perception data to collect). Thus, the yield or the usability of perception data collected may go down or may be low.

Then, as shown at 504, after the server receives the perception data from the vehicle pool, large amounts of data may be stored in each perception data collect step, which may specify significant amount of storage spaces and costs. Then, certain perception data may be removed/filtered during a manual filtering step if they are found to be redundant or not containing the right/suitable metadata attributes, image features, and/or driving scenarios. As shown at 506, after the perception data are filtered, the server may (manually) determine whether additional perception data is specified (e.g., for ML/NN training), and the server may indicate to another set of vehicles (which may include same/different vehicles from the previous vehicle pools) where to collect the additional perception data and what to collect. The server may repeat the steps described in connection with 502, 504, and 506 until sufficient perception data are collected.

As shown at 508, after sufficient perception data are collected, the collected perception data may be transmitted and stored in a perception dataset (e.g., a database). Then, the server or an annotation entity may be configured/requested to perform an annotation on this perception dataset to obtain a set of annotated data. In other words, the collected perception data may be annotated for purposes of ML/NN training.

Figure 6:
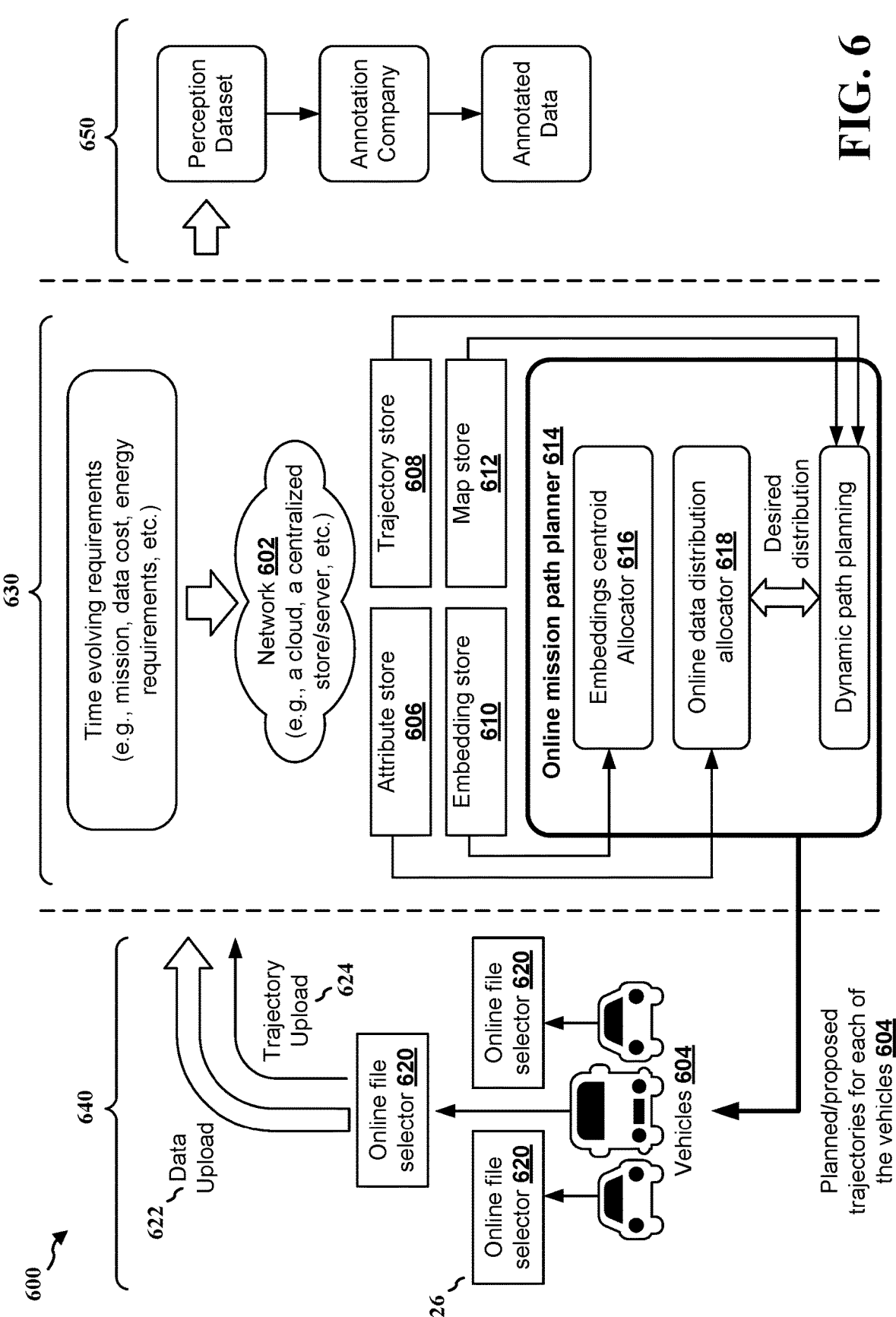
FIG. 6 is a diagram illustrating an example architecture of a centralized cloud store that is capable of effectively rejecting samples to be collected to reduce the cost of data storage, to improve data diversity, and/or to reduce redundant samples in accordance with various aspects of the present disclosure.

FIG. 6 is a diagram 600 illustrating an example architecture of a centralized cloud store that is capable of effectively rejecting samples to be collected to reduce the cost of data storage, to improve data diversity, and/or to reduce redundant samples in accordance with various aspects of the present disclosure. At a high level, as shown at 630, a server, a cloud, or a centralized store, etc. (collectively as a network entity 602 hereafter) may be configured to collect perception data (which may be referred to as "sample(s)") from a set of vehicles 604 (of a vehicle pool) based on a set of time evolving specifications, such as based on the mission(s)/goal(s) of the perception data collection, the cost, the available storage, the energy constraint(s)/specification(s), etc.

The network entity 602 may include various functions, modules and/or entities (which may be referred to as the "store(s)" collectively) that may be used for assisting the network entity 602 to plan routes to be travelled by the set of vehicles 604 (e.g., for perception data collection purposes) and/or to configure the set of vehicles 604 regarding what types of perception data to generate, collect, and/or upload, etc. For example, in one aspect of the present disclosure, the network entity 602 may include at least an attribute store 606, a trajectory store 608, an embedding store 610, and a map store 612 (e.g., an HD map database), where outputs from these stores and database may be used by an online mission path planner 614 for planning/optimizing perception data to be collected (e.g., by the set of vehicles 604). The online mission path planner 614 may further include or may be associated with an embeddings centroids allocator 616 and/or an online data distribution allocator 618.

In one example, the attribute store 606 may be configured to contain attribute wise frequency (e.g., a histogram/graph that shows the frequency of numerical data using rectangles), co-occurrence frequencies (e.g., a combination of attributes and annotation objects), and/or the priority on attributes which specify the most attention (e.g., attributes with low frequencies). For purposes of the present disclosure and/or in the context of perception data collection, an attribute may refer to a characteristic or a property of an object, event, or phenomenon that is being observed, measured, or recorded. Attributes may be specific pieces of information or variables that the network entity 602 (e.g., or researchers/data collectors) are interested in collecting and analyzing. For example, if the set of vehicles 604 is configured to collect the perception data while they are moving on the roads (e.g., while they are being driven), the attributes may include road conditions, road topology (e.g., intersections, tunnels, roundabouts, crossings, etc.), road metadata (e.g., hilly/curvy roads), specified/special occurrences (e.g., toll station, railway crossing etc.), countries/regions in which the set of vehicles 604 is located, the time of the day (e.g., day time, night time, etc.), the environmental condition(s) (e.g., the weather, the lighting condition, the pollution, etc.), and/or traffic information (e.g., traffic density, road construction, etc.), etc. In some implementations, the attributes may also include dynamic objects (e.g., vehicles, cyclist, pedestrians, etc.) and traffic scenarios (e.g., cut-in scenarios, lane change scenarios, etc.).

The trajectory store 608 may be configured to track and store the different coordinates (e.g., GPS/GNSS coordinates) of trajectories driven by vehicles in the set of vehicles 604 pool, and to maintain these coordinates of trajectories on a map representation. For purposes of the present disclosure and/or in the context of driving path planning, a trajectory may refer to the path that a vehicle follows over time. It may be a sequence of states (positions and velocities) that describes the motion of the vehicle from its starting point to its destination. Trajectory planning may be an important aspect of autonomous driving systems, as it involves determining a safe and efficient path for the vehicle to navigate through its environment. The trajectories also may include locations across different countries and/or regions (e.g., within a country).

The embedding store 610 may be configured to employ a backbone of a convolutional neural network (CNN), such as a deep neural network (DNN) or a transformer based DNN, to calculate, for the collected images and point clouds, embeddings that are sensitive to frame level and object level features. Then, the calculated embeddings may be clustered using density-based spatial clustering of applications with noise (DBSCAN), and one or more centroids of the clusters may be evaluated to then be allocated to different vehicles in the set of vehicles 604 (e.g., by the embeddings centroids allocator 616). For purposes of the present disclosure, "embedding" may refer to a representation of data in a lower-dimensional space. This mechanism may be commonly applied in machine learning and computer vision to transform complex data, such as images or sensor readings (e.g., point clouds), into a more compact and meaningful format. A centroid may refer to the center or the average point of a cluster of data points in a feature space, which may be used interchangeably with "embeddings centroid(s)." For example, in machine learning, data points may represent individual instances or examples in a dataset, where each data point may have multiple features or attributes. The feature space may be a multi-dimensional space defined by the features of the data points, where each axis in this space may correspond to a specific feature. A cluster may refer to a group of data points that share similarities or are close to each other in the feature space. Clustering algorithms (e.g., DBSCAN) typically aim to group data points into clusters based on certain criteria. The centroid of a cluster may refer to a point in the feature space that serves as a representative or central location for that cluster. It may be computed as the mean of the feature values of all the data points in the cluster. In the context of machine learning or perception data collection/curation, a feature may refer to an individual measurable property or characteristic of a phenomenon being observed. Features may be the inputs used by machine learning models to make predictions or perform tasks. They may represent the different dimensions or aspects of the data that a machine learning model uses to learn patterns and relationships.

The map store 612 may be an HD map database or a database that include HD maps (and also non-HD maps). As discussed above, HD maps may contain high precision and detailed semantic attributes such as: road conditions, road topology (e.g., intersections, tunnels, roundabouts, crossings, etc.), road metadata (e.g., hilly/curvy roads), specified/special occurrences (e.g., toll station, railway crossing etc.), lane types, intersection topologies, map objects (e.g., traffic signs, lights), and/or road/structure information (e.g., tunnels, merges, splits, etc.). These attributes may not usually spatially be localized in open street maps and/or navigational maps. Depending on the implementation, the output of the map store 612 may provide map database access to the online mission path planner 614 (or to a dynamic path planning module associated with the online mission path planner 614) to enable the dynamic path planning module to search the map database to perform the routing based on the information obtained from the static (HD) map information (e.g., as discussed in connection with 808 below).

The online mission path planner 614 (e.g., a cloud based online path planner) may be configured to take as input the dataset specifications, existing trajectory data, and/or cost constraints, etc. to compute the routes (trajectories) optimally over an entire vehicle pool (e.g., for the set of vehicles 604). For example, given a desired/defined attribute distribution, online mission path planner 614 may use HD maps and other external sources (e.g., online traffic information/predictions) to plan new trajectories for each vehicle in the set of vehicles 604 (or in the vehicle pool) to go out for data collection. In addition, the online mission path planner 614 may take into input embedding centroids from the embedding store 610 and then allocate them to each vehicle in the set of vehicles 604 to diversify the collection of samples across geographical locations and joint attributes-embedding spaces.

Figure 7:
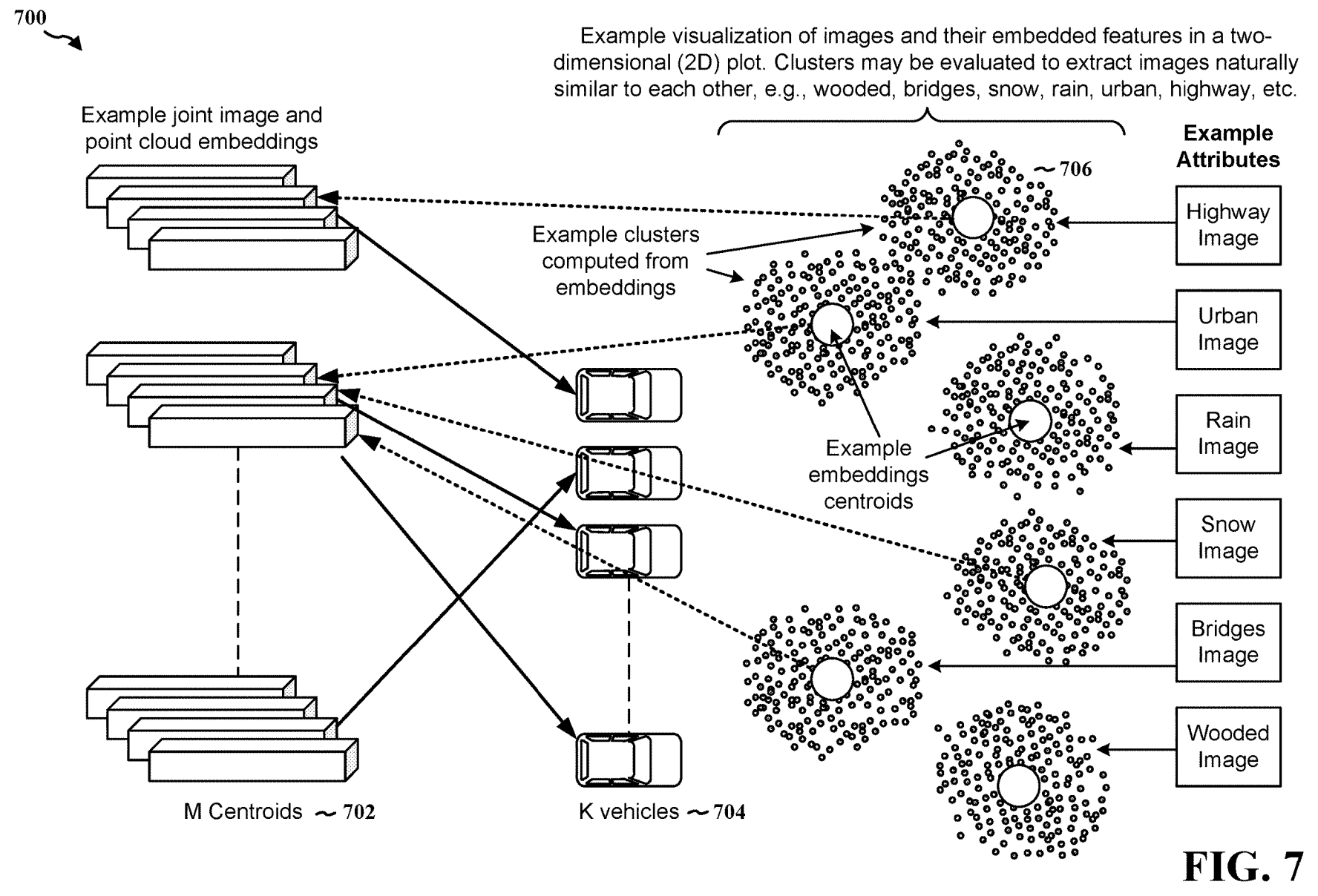

FIG. 7 is a diagram 700 illustrating an example embeddings centroids allocator in accordance with various aspects of the present disclosure. In one example, as shown at 702, the embeddings centroids allocator 616 associated with the online mission path planner 614 may be configured to receive M centroids representing distribution of the features of perception data. Then, as shown at 704, the embeddings centroids allocator 616 may output a subset of different embeddings centroids to K different vehicles (e.g., in the set of vehicles 604). As shown at 706, visualization of images and their embedded features may be shown by a two-dimensional (2D) plot, where clusters may be evaluated to extract images naturally similar to each other, e.g., wooded images, bridge images, snow images, rain images, urban images, highway images, etc.

Referring back to FIG. 6, the online data distribution allocator 618 associated with the online mission path planner 614 may be configured to compute desired distribution (s) to be collected by evaluating difference between specifications and existing state in the attribute store 606.

Figure 8:
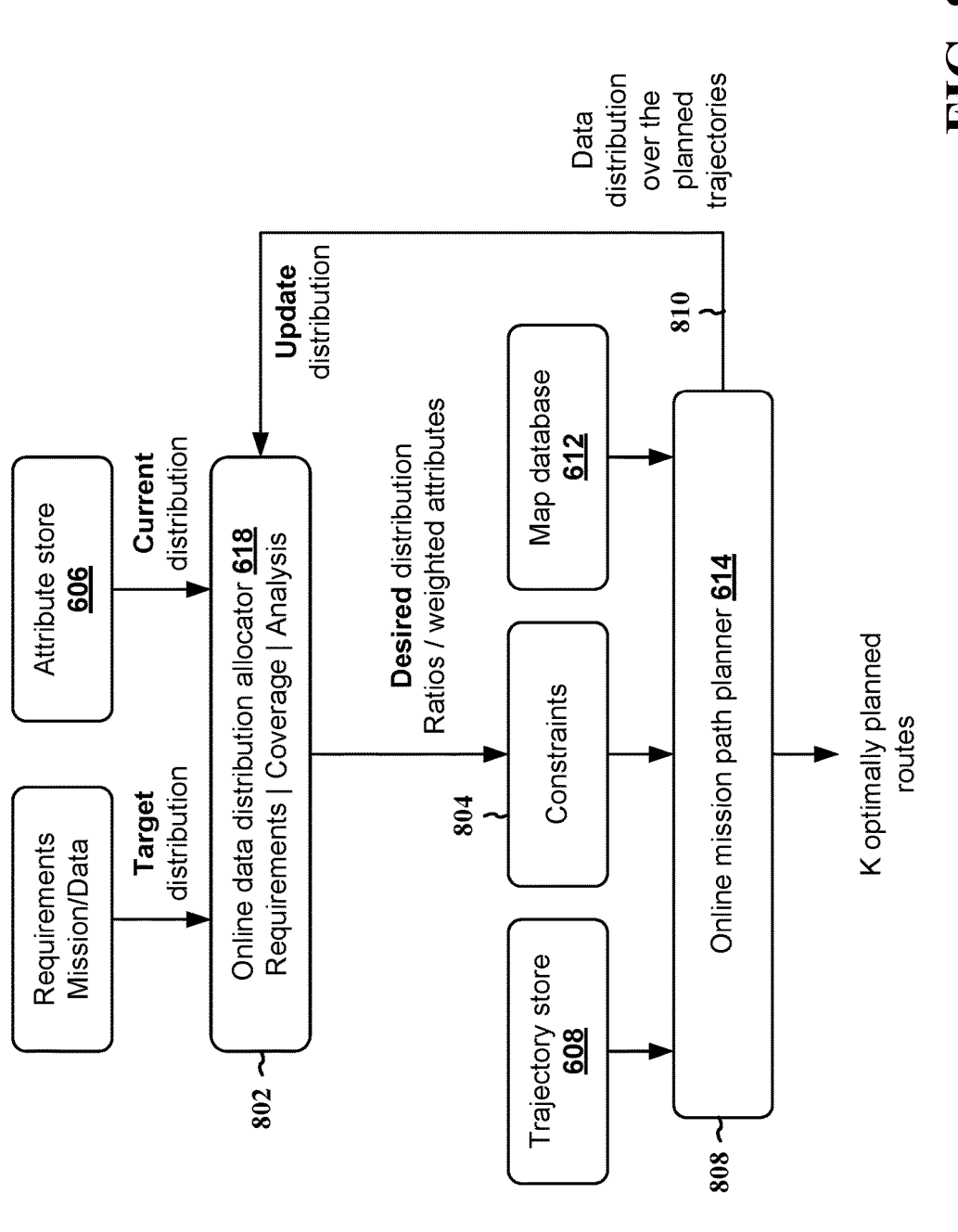
FIG. 8 is a diagram illustrating an example of an online mission path planner in accordance with various aspects of the present disclosure.

FIG. 8 is a diagram 800 illustrating an example of an online mission path planner in accordance with various aspects of the present disclosure. The online mission path planner 614 discussed in connection with FIG. 6 may be configured to provide dynamic path planning on the cloud for multiple vehicles (e.g., for the set of vehicles 604) for collecting perception data specified by the network entity 602. For example, for the K vehicles distributed with different environmental parameters (e.g., as discussed in connection with FIG. 7), the online mission path planner 614 may allocate trajectories for these vehicles based on a desired attribute distribution.

For example, as shown at 802, the online data distribution allocator 618 associated with the online mission path planner 614 may receive a set of target distributions (e.g., a set of specifications for perception data to be collected) and also a set of current distributions (e.g., currently available perception data) from the attribute store 606. Then, based on the analyzing/comparing the set of target distributions with the set of current distributions, the online data distribution allocator 618 may generate a set of desired distribution, which may include ratios and/or weighted attributes. In other words, the online data distribution allocator 618 may take current and target distributions to select the attributes the network entity 602 configures/desires to collect the most and the ratios. Then, as shown at 804, the set of desired distributions may be added to a set of constraints which is an input to the online mission path planner 614. The constraints may include desired attribute ratios, the number of vehicles and their start locations, and/or the predicted traffic density, predicted weather (e.g., for time of the drive), etc.

As shown at 808, based on outputs from the trajectory stores 608 (e.g., a set of trajectories driven by a set of vehicles), the constraints, and the map store 612 (e.g., a set of HD map data output), the online mission path planner 614 may plan/propose trajectories (e.g., routes) for each of the K vehicles, such that each of the K vehicles may try to prioritize using the planned/proposed trajectories and collecting perception data while travelling at these planned/proposed trajectories. For example, the online mission path planner 614 may sample a set of candidate trajectories and pick the one that most optimally satisfies the constraints (e.g., attributes generated from static perception data from HD maps may be used), and/or pick the one that does not geographically intersect with the trajectories from already collected data provided by the trajectory store 608.

As shown at 810, as the planned/proposed trajectories may have a new attribute distribution, they may be used by the online data distribution allocator 618 to update the desired distribution for planning routes for the next set of vehicles. In other words, after trajectories are planned/proposed, the network entity 602 or the online data distribution allocator 618 may re-compute the desired ratios with the updated distribution (e.g., similar to a close-loop system where desired distribution may continue to change based on data distribution over the planned/proposed trajectories).

Referring back to FIG. 6, as shown at 640, based on the planned/proposed trajectories from the network entity 602 (e.g., from the online mission path planner 614 of the network entity 602), the set of vehicles 604 may collect perception data when they are on the planned/proposed trajectories (and during the specified time if configured).

FIGS. 9A, 9B, and 9C are diagrams 900A, 900B, and 900C, respectively, illustrating an example of a vehicle collecting perception data based on a planned/proposed trajectory in accordance with various aspects of the present disclosure. As shown by the diagram 900A of FIG. 9A, the network entity 602 may provide a set of planned planned/proposed trajectories for a vehicle 904 (e.g., a vehicle within the set of vehicles 604 described in connection with FIG. 6) to collect perception data, which may include a planned/proposed trajectory 906. For example, the network entity 602 may lack perception data for areas in proximity to the planned/proposed trajectory 906 and the set of planned planned/proposed trajectories.

As shown by the diagram 900B of FIG. 9B, if the vehicle 904 is requested/configured (e.g., based on a user input) to travel to a destination, the vehicle 904 (or the autonomous/assisted driving system or the navigation system of the vehicle 904) may try to use/plan a navigation route 908 that uses/overlaps with the planned/proposed trajectory 906 (e.g., for purposes of perception data collection). Then, the vehicle 904 may collect perception data while travelling on the planned/proposed trajectory 906 and send the perception data collected to the network entity 602 (e.g., as shown at 622 of FIG. 6). In some examples, the vehicle 904 may also include an indication of the trajectory where the perception data is collected such as the planned/proposed trajectory 906 (e.g., also as shown at 624 of FIG. 6). In some scenarios, the navigation route 908 may not be the most optimal/efficient/quickest route to the destination. As such, once the vehicle 904 has collected perception data from the planned/proposed trajectory 906, the vehicle 904 may resume to travel to the destination using the most optimal/efficient/quickest route for future navigations.

As shown by the diagram 900C of FIG. 9C, in some scenarios, the vehicle 904 may not be able to travel to the destination following (all portions of) the navigation route 908. For example, the driver of the vehicle 904 may intervene and decide to take an alternative route or a portion of a navigation route may not be available (e.g., due to road construction or blockage). As shown at 910, under such scenarios, the vehicle 904 may still collect perception data while travelling on the (portion of the) navigation route 908. Then, the vehicle 904 may upload the collected perception data to the network entity 602 (e.g., as shown at 622 of FIG. 6) and also include an indication of the trajectory where the perception data is collected (e.g., as shown at 624 of FIG. 6).

In some implementations, the set of planned planned/proposed trajectories for the vehicle 904 may also be configured to be associated with at least one other factor/condition, such as the time of the day, the weather, the lighting condition, and/or the traffic condition, etc. For example, the network entity 602 may specify the vehicle 904 to collect perception data while travelling on the set of planned planned/proposed trajectories and also during a specified time period (e.g., 10:00 AM to 1:00 PM), during a specified weather (e.g., during a rainy day), during a specified traffic condition (e.g., number of detected vehicles exceed a threshold), and/or during a specified lighting condition (e.g., during a dim/low-light condition), etc. As such, if the associated factor(s)/condition(s) are not met, the vehicle 904 may be configured to skip collecting the perception data while travelling on the set of planned planned/proposed trajectories.

Referring back to FIG. 6, as shown at 626 (in 640), each of the set of vehicles 604 (e.g., the vehicle 904) may be configured with an online file selector 620 (e.g., configured by the network entity 602), where the online file selector 620 may enable the set of vehicles 604 to determine/select which of the collected perception data is to be uploaded to the network entity 602. This may greatly reduce the amount of perception data to be stored at the network entity 602 and also the signaling overhead between the set of vehicles 604 and the network entity 602.

Figure 10:
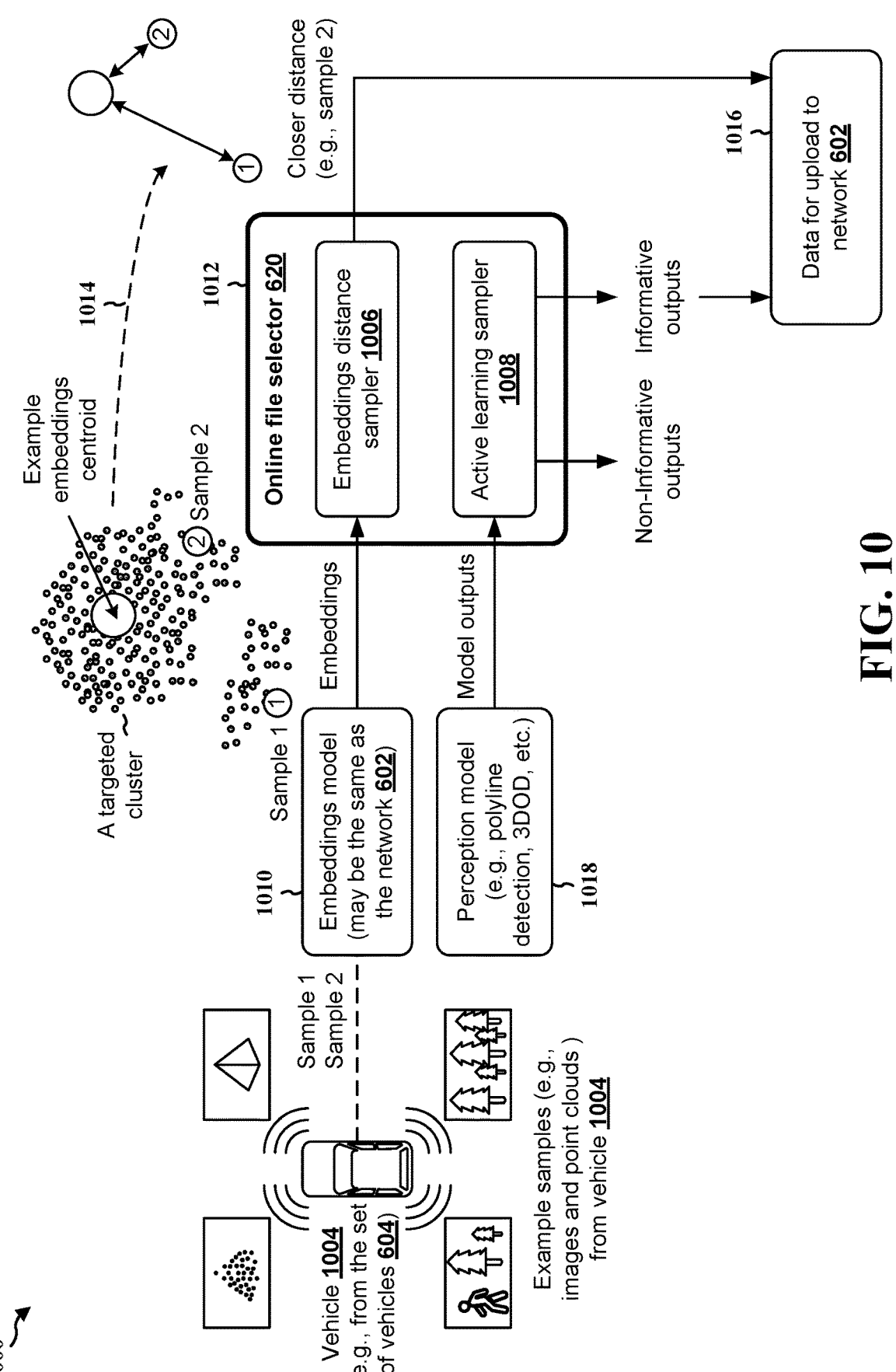
FIG. 10 is a diagram illustrating an example of an online file selector in accordance with various aspects of the present disclosure.

FIG. 10 is a diagram 1000 illustrating an example of an online file selector in accordance with various aspects of the present disclosure. In one example, as shown at 1010, a vehicle 1004 (e.g., from the set of vehicles 604) may include a set of embeddings models, which may be configured by the network entity 602 such that the same set of embeddings models is used by the set of vehicles 604 and the network entity 602. Based on images and/or point clouds collected by the sensor(s) of the vehicle 1004, the vehicle 1004 may calculate/generate a set of samples (e.g., embeddings) using the set of embeddings models. For example, the vehicle 1004 may calculate/generate a first sample/embedding (sample 1) and a second sample/embedding (sample 2) using an embeddings model (e.g., a transformer based DNN), and output/provide these samples (e.g., the embeddings) to the online file selector 620.

In one aspect, as shown at 1012, the online file selector 620 may include an embeddings distance sampler 1006 that is configured to use the embeddings centroids allocator 616 to perform distance-based file sampling for embeddings (e.g., between embeddings of the new collect and the embeddings centroids). For example, as shown at 1014, the goal of the embeddings distance sampler 1006 may be to find most relevant/interesting sample or perception data to keep, e.g., if a sample (e.g., sample 1) is located further away from a targeted cluster, it may indicate that the sample is more scarce/rare and may be worth of keeping (e.g., to help increase dataset diversity) compared to a sample that is in the targeted cluster or in proximity to the targeted embeddings centroid (e.g., sample 2). In other words, if the distance between a sample/data and a targeted cluster is above a distance threshold, the sample/data may be suitable/interesting for the upload (e.g., as shown at 1016). This mechanism may reduce the number of samples/perception data uploaded by the vehicle 1004 to the network entity 602.

In some implementations, as shown at 1018, the vehicle 1004 may also include a set of perception models, which may be used for performing various detections, such as polyline detections, 3D object detections (3DOD), etc. For example, a convolutional neural network (CNN) may be used by the vehicle 1004 for generating outputs to the online file selector 620 on new sample images/point clouds to predict e.g., 3D objects, polylines, pedestrians, etc. As shown at 1012, in some examples, the online file selector 620 may include an active learning sampler 1008 that is configured to use an active learning loop to compute model predictions (e.g., 3DOD/polyline outputs, etc.), and uses uncertainties to evaluate whether a sample (e.g., the first sample, the second sample, etc.) is informative and is to be uploaded (or suitable for upload), such as shown at 1016.

Referring back to FIG. 6, as show at 650, after sufficient perception data are collected, the collected perception data may be transmitted and stored in a perception dataset (e.g., a database). Then, the network entity 602 or an annotation entity may be configured/requested to perform an annotation on this perception dataset to obtain a set of annotated data. In other words, the collected perception data may be annotated for purposes of ML/NN training.

Figure 11:
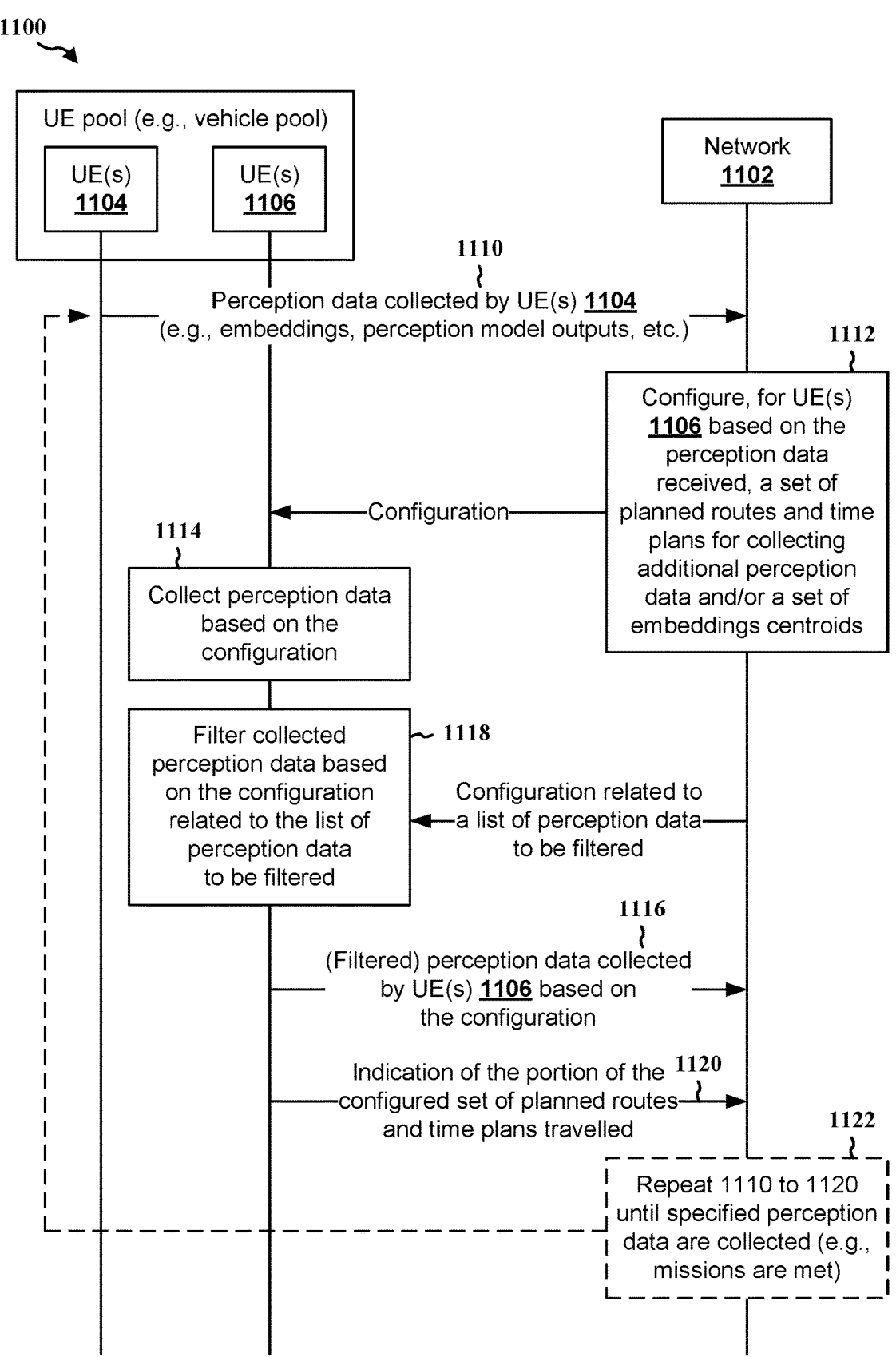
FIG. 11 is a communication flow illustrating an example of a network entity (e.g., a centralized cloud store) configuring a set of UEs (e.g., vehicles) with a set of planned/proposed trajectories for perception data collection in accordance with various aspects of the present disclosure.

FIG. 11 is a communication flow 1100 illustrating an example of a network entity (e.g., a centralized cloud store) configuring a set of UEs (e.g., vehicles) with a set of planned/proposed trajectories for perception data collection in accordance with various aspects of the present disclosure. The numberings associated with the communication flow 1100 do not specify a particular temporal order and are merely used as references for the communication flow 1100.

At 1110, a network entity 1102 (e.g., the network entity 602, a server, a cloud, or a centralized store, etc.) may receive, from a first set of UEs 1104 (e.g., a first set of vehicles, a first set of autonomous driving systems, etc.), a set of perception data collected by the first set of UEs 1104, such as described in connection with FIGS. 5, 6, and 10. The first set of UEs 1104 may belong to a UE pool (e.g., the vehicle pool or the set of vehicle 604 discussed in connection with FIG. 6). The perception data may include embeddings calculated by the first set of UEs 1104 based on images and point clouds they captured (e.g., using embeddings model(s) such as CNN, DNN, transformer based DNN, etc.) and/or outputs from a set of prediction models (e.g., polyline detections, 3DOD, etc.). In addition, the perception data may also include a set of centroids representing distribution of features of the perception data.

At 1112, as described in connection with FIGS. 6 and 8, the network entity 1102 may analyze and compare the currently available perception data/distribution (including perception data received from the first set of UEs 1104 at 1110) with a set of specifications (e.g., a set of target distributions/missions, etc.) to determine additional perception data specified (e.g., a set of desired distributions to be collected). Then, based on the additional perception data specified, the network entity 1102 may configure, for a second set of UEs 1106 (e.g., by transmitting a configuration to the second set of UEs 1106), a set of planned routes and time plans for collecting additional perception data and/or a set of embeddings centroids. The second set of UEs 1106 may belong to the same UE pool (e.g., vehicle pool) as the first set UEs 1104, and there may be overlapping and/or non-overlapping UEs between the first set UEs 1104 and the second set of UEs 1106.

At 1114, the second set of UEs 1106 may collect the perception data based on the configuration (e.g., based on the configured set of planned routes and time plans for collecting additional perception data and/or additional embeddings centroids), such as described in connection with FIGS. 6, 9A, 9B, 9C, and 10. Then, at 1116, the second set of UEs 1106 may transmit, to the network entity 1102, the perception data collected based on the configuration received at 1112.

In some implementations, at 1118, the network entity 1102 may also configure, for the second set of UEs 1106 (e.g., based on the perception data received from the first set of UEs 1104), a list of perception data to be filtered. Note, while the diagram shows this configuration is different from the configuration received at 1112, it is merely for illustration purposes. The configuration related to the list of perception data to be filtered may be included in the same configuration as the set of planned routes and time plans for collecting additional perception data and/or additional embeddings centroids, or may be a different and separated configuration. Then, based on the configuration related to the list of perception data to be filtered, the second set of UEs 1106 may filter the collected perception data such as described in connection with FIG. 10. For example, the second set of UEs 1106 may use an online file selector (or an embeddings distance sampler) to select samples that are closer to targeted cluster(s) for upload, and/or use the online file selector (or an active learning sampler) to select informative perception model outputs for upload (e.g., by filtering out non-informative outputs).

In some implementations, at 1120, the second set of UEs 1106 may also transmit, to the network entity 1102, an indication of a portion of the configured set of planned routes and time plans travelled by the second set of UEs 1106 (e.g., by each UE in the second set of UEs 1106), such as described in connection with FIGS. 9A, 9B, and 9C. Note the indication may be included along with the perception data collected at 1116.

As shown at 1122, the network entity 1102 may repeat one or more steps above (e.g., steps described in connection with 1110 to 1120) until sufficient perception data are collected or specified mission(s) are met. As such, the network entity 1102 may continue to update and change planned/proposed routes for different UEs (e.g., vehicles) based on time evolving specifications. For example, the network entity 1102 may configure, for a third set of UEs in the UE pool (e.g., which may have UEs overlapped/non-overlapped with the first set of UEs 1104 and/or the second set of UEs 1106) based on the perception data received from the second set of UEs at 1116, another set of planned routes and time plans for collecting additional perception data and/or embeddings centroids. Similarly, the network entity 1102 may receive, from the third set of UEs, the additional perception data based on the configured set of planned routes and time plans and/or the configured set of embeddings centroids.

As discussed in connection with 650 of FIG. 6, the network entity 1102 may also output, to a perception dataset, the perception data collected from the first set of UEs 1104 and/or the second set of UEs 1106, and receive a set of annotated data based on the output. In some examples, the annotation may be performed by the network entity 1102 (or an entity associated with the network entity 1102. In some examples, the network entity 1102 may be performed by an outside entity (e.g., an annotation company).

Aspects presented herein may improve the efficiency of perception data collection and curation, thereby improving the overall performance of ML/NN model training (e.g., for autonomous/assisted driving systems) based on the perception data. Autonomous perception data may specify large amounts of multisensory perception data to be collected across multiple countries, conditions and scenarios. This may involve a data collection process and a data curation process. As of today, data collection and data curation (dataset design) are independent steps and hence, generate very often redundant, non-diverse data. Aspects presented herein provide an optimal cloud-based solution for collecting and optimizing data for path planning. Data collected from vehicle pool globally are uploaded to a cloud-based centralized entity for processing and optimization. Aspects presented herein include the following aspects/features: online file selector, embedding store, trajectory store, attribute store, HD maps, online distribution allocator, embeddings centroids allocator, online path planner, etc.

Aspects presented herein include a generic method that allows to simultaneously satisfy evolving perception specifications and mission-specific specifications and logistic costs in an online setup and uses the cloud to enhance the data collection and selection step over multiple vehicles. The online path planner plans optimal trajectories over multiple vehicles to satisfy the desired data distributions and geographical separation constraints. The online file selector picks the most diverse and most informative multi-model perception data for training of CNN/DNN models for various autonomous driving perception tasks.

FIG. 12 is a flowchart 1200 of a method of wireless communication. The method may be performed by a network entity (e.g., the one or more location servers 168; the base station 102; network entity 602, 1102, 1460). The method may enable the network entity to configured a pool of UEs to collect perception data for machine learning model training based on a set of specifications (e.g., dataset/mission specifications, cost specifications, storage, vehicle deployment, logistics costs, etc.), thereby reducing the cost of data storage, improving data diversity, and/or reducing redundant data.

At 1202, the network entity may receive, from a first set of UEs, a first set of perception data collected by the first set of UEs, such as described in connection with FIGS. 6 to 11. For example, as described in connection with 1110 of FIG. 11, the network entity 1102 may receive, from the first set of UEs 1104, perception data collected by the first set of UEs 1104. The reception of the first set of perception data may be performed by, e.g., the trajectory planning component 199, the network processor(s) 1412, and/or the network interface 1480 of the network entity 1460 in FIG. 14.

At 1204, the network entity may configure, for a second set of UEs based on the first set of perception data, at least one of: a set of planned routes and time plans for collecting a second set of perception data or a set of embeddings centroids, such as described in connection with FIGS. 6 to 11. For example, as described in connection with 1112 of FIG. 11, the network entity 1102 may analyze and compare the currently available perception data/distribution (including perception data received from the first set of UEs 1104 at 1110) with a set of specifications (e.g., a set of target distributions/missions, etc.) to determine additional perception data specified (e.g., a set of desired distributions to be collected). Then, based on the additional perception data specified, the network entity 1102 may configure, for a second set of UEs 1106 (e.g., by transmitting a configuration to the second set of UEs 1106), a set of planned routes and time plans for collecting additional perception data and/or a set of embeddings centroids. The configuration may be performed by, e.g., the trajectory planning component 199, the network processor(s) 1412, and/or the network interface 1480 of the network entity 1460 in FIG. 14.

In one example, to configure the set of planned routes and time plans for collecting the second set of perception data, the network entity may be configured to evaluate a difference between the first set of perception data and a set of existing perception data in a perception dataset, determine the set of planned routes and time plans for collecting the second set of perception data based on the evaluated difference, and transmit the set of planned routes and time plans to the second set of UEs.

In another example, to configure the set of planned routes and time plans for collecting the second set of perception data, the network entity may be configured to obtain information related to at least one of: data specified for a perception dataset, existing trajectory data, or a cost constraint, determine the set of planned routes and time plans for collecting the second set of perception data based on the information, and transmit the set of planned routes and time plans to the second set of UEs.

In another example, to configure the set of planned routes and time plans for collecting the second set of perception data, the network entity may be configured to obtain an indication of an attribute distribution, determine the set of planned routes and time plans for collecting the second set of perception data based on the indication, map data, and traffic information, and transmit the set of planned routes and time plans to the second set of UEs.

At 1208, the network entity may receive, from the second set of UEs, the second set of perception data based on at least one of the configured set of planned routes and time plans or the configured set of embeddings centroids, such as described in connection with FIGS. 6 to 11. For example, as described in connection with 1116 of FIG. 11, the network entity 1102 may receive, from the second set of UEs 1106, the perception data collected based on the configuration transmitted at 1112. The reception of the second set of perception data may be performed by, e.g., the trajectory planning component 199, the network processor(s) 1412, and/or the network interface 1480 of the network entity 1460 in FIG. 14.

In one example, to receive, from the second set of UEs, the second set of perception data based on the configured set of planned routes and time plans, the network entity may be configured to receive, from each UE in the second set of UEs, an indication of a portion of the configured set of planned routes and time plans travelled by each UE.

In another example, the network entity may configure, for the second set of UEs based on the first set of perception data, a list of perception data to be filtered, where the reception of the second set of perception data is further based on the list of the perception data to be filtered, such as described in connection with FIGS. 6 to 11. For example, as described in connection with 1118 of FIG. 11, the network entity 1102 may also configure, for the second set of UEs 1106 (e.g., based on the perception data received from the first set of UEs 1104), a list of perception data to be filtered. The configuration may be performed by, e.g., the trajectory planning component 199, the network processor(s) 1412, and/or the network interface 1480 of the network entity 1460 in FIG. 14.

In another example, the network entity may output, to a perception dataset, the first set of perception data and the second set of perception data, and receive a set of annotated data based on the output of the first set of perception data and the second set of perception data, such as described in connection with FIG. 6. For example, as described in connection with 650 of FIG. 6, the network entity 1102 may also output, to a perception dataset, the perception data collected from the first set of UEs 1104 and/or the second set of UEs 1106, and receive a set of annotated data based on the output. The output of the first set of perception data and the second set of perception data and/or the reception of the set of annotated data may be performed by, e.g., the trajectory planning component 199, the network processor(s) 1412, and/or the network interface 1480 of the network entity 1460 in FIG. 14.

In another example, the network entity may configure, for a third set of UEs based on the second set of perception data, at least one of: a second set of planned routes and time plans for collecting a third set of perception data or a second set of embeddings centroids; and receive, from the third set of UEs, the third set of perception data based on at least one of the configured second set of planned routes and time plans or the configured second set of embeddings centroids, such as described in connection with FIGS. 6 to 11. For example, as described in connection with 1122 of FIG. 11, the network entity 1102 may repeat one or more steps above (e.g., steps described in connection with 1110 to 1120) until sufficient perception data are collected or specified mission(s) are met. As such, the network entity 1102 may continue to update and change planned/proposed routes for different UEs (e.g., vehicles) based on time evolving specifications. For example, the network entity 1102 may configure, for a third set of UEs in the UE pool (e.g., which may have UEs overlapped/non-overlapped with the first set of UEs 1104 and/or the second set of UEs 1106) based on the perception data received from the second set of UEs at 1116, another set of planned routes and time plans for collecting additional perception data and/or embeddings centroids. Similarly, the network entity 1102 may receive, from the third set of UEs, the additional perception data based on the configured set of planned routes and time plans and/or the configured set of embeddings centroids. The configuration of the at least one of: the second set of planned routes and time plans for collecting the third set of perception data or the second set of embeddings centroids and/or the reception of the third set of perception data may be performed by, e.g., the trajectory planning component 199, the network processor(s) 1412, and/or the network interface 1480 of the network entity 1460 in FIG. 14.

In another example, the first set of perception data may be based on a set of centroids representing distribution of features of the first set of perception data.

In another example, the first set of UEs may at least partially overlap with the second set of UEs.

In another example, the first set of perception data or the second set of perception data may include at least one of: a set of images captured by at least one camera, or a set of point clouds captured or generated by at least one radar.

In another example, the network entity may annotate the second set of perception data.

FIG. 13 is a flowchart 1300 of a method of wireless communication. The method may be performed by a network entity (e.g., the one or more location servers 168; the base station 102; network entity 602, 1102, 1460). The method may enable the network entity to configured a pool of UEs to collect perception data for machine learning model training based on a set of specifications (e.g., dataset/mission specifications, cost specifications, storage, vehicle deployment, logistics costs, etc.), thereby reducing the cost of data storage, improving data diversity, and/or reducing redundant data.

At 1302, the network entity may receive, from a first set of UEs, a first set of perception data collected by the first set of UEs, such as described in connection with FIGS. 6 to 11. For example, as described in connection with 1110 of FIG. 11, the network entity 1102 may receive, from the first set of UEs 1104, perception data collected by the first set of UEs 1104. The reception of the first set of perception data may be performed by, e.g., the trajectory planning component 199, the network processor(s) 1412, and/or the network interface 1480 of the network entity 1460 in FIG. 14.

At 1304, the network entity may configure, for a second set of UEs based on the first set of perception data, at least one of: a set of planned routes and time plans for collecting a second set of perception data or a set of embeddings centroids, such as described in connection with FIGS. 6 to 11. For example, as described in connection with 1112 of FIG. 11, the network entity 1102 may analyze and compare the currently available perception data/distribution (including perception data received from the first set of UEs 1104 at 1110) with a set of specifications (e.g., a set of target distributions/missions, etc.) to determine additional perception data specified (e.g., a set of desired distributions to be collected). Then, based on the additional perception data specified, the network entity 1102 may configure, for a second set of UEs 1106 (e.g., by transmitting a configuration to the second set of UEs 1106), a set of planned routes and time plans for collecting additional perception data and/or a set of embeddings centroids. The configuration may be performed by, e.g., the trajectory planning component 199, the network processor(s) 1412, and/or the network interface 1480 of the network entity 1460 in FIG. 14.

In one example, to configure the set of planned routes and time plans for collecting the second set of perception data, the network entity may be configured to evaluate a difference between the first set of perception data and a set of existing perception data in a perception dataset, determine the set of planned routes and time plans for collecting the second set of perception data based on the evaluated difference, and transmit the set of planned routes and time plans to the second set of UEs.

In another example, to configure the set of planned routes and time plans for collecting the second set of perception data, the network entity may be configured to obtain information related to at least one of: data specified for a perception dataset, existing trajectory data, or a cost constraint, determine the set of planned routes and time plans for collecting the second set of perception data based on the information, and transmit the set of planned routes and time plans to the second set of UEs.

In another example, to configure the set of planned routes and time plans for collecting the second set of perception data, the network entity may be configured to obtain an indication of an attribute distribution, determine the set of planned routes and time plans for collecting the second set of perception data based on the indication, map data, and traffic information, and transmit the set of planned routes and time plans to the second set of UEs.

At 1308, the network entity may receive, from the second set of UEs, the second set of perception data based on at least one of the configured set of planned routes and time plans or the configured set of embeddings centroids, such as described in connection with FIGS. 6 to 11. For example, as described in connection with 1116 of FIG. 11, the network entity 1102 may receive, from the second set of UEs 1106, the perception data collected based on the configuration transmitted at 1112. The reception of the second set of perception data may be performed by, e.g., the trajectory planning component 199, the network processor(s) 1412, and/or the network interface 1480 of the network entity 1460 in FIG. 14.

In one example, to receive, from the second set of UEs, the second set of perception data based on the configured set of planned routes and time plans, the network entity may be configured to receive, from each UE in the second set of UEs, an indication of a portion of the configured set of planned routes and time plans travelled by each UE.

In another example, as shown at 1306, the network entity may configure, for the second set of UEs based on the first set of perception data, a list of perception data to be filtered, where the reception of the second set of perception data is further based on the list of the perception data to be filtered, such as described in connection with FIGS. 6 to 11. For example, as described in connection with 1118 of FIG. 11, the network entity 1102 may also configure, for the second set of UEs 1106 (e.g., based on the perception data received from the first set of UEs 1104), a list of perception data to be filtered. The configuration may be performed by, e.g., the trajectory planning component 199, the network processor(s) 1412, and/or the network interface 1480 of the network entity 1460 in FIG. 14.

In another example, as shown at 1310, the network entity may output, to a perception dataset, the first set of perception data and the second set of perception data, and receive a set of annotated data based on the output of the first set of perception data and the second set of perception data, such as described in connection with FIG. 6. For example, as described in connection with 650 of FIG. 6, the network entity 1102 may also output, to a perception dataset, the perception data collected from the first set of UEs 1104 and/or the second set of UEs 1106, and receive a set of annotated data based on the output. The output of the first set of perception data and the second set of perception data and/or the reception of the set of annotated data may be performed by, e.g., the trajectory planning component 199, the network processor(s) 1412, and/or the network interface 1480 of the network entity 1460 in FIG. 14.

In another example, as shown at 1312, the network entity may configure, for a third set of UEs based on the second set of perception data, at least one of: a second set of planned routes and time plans for collecting a third set of perception data or a second set of embeddings centroids; and receive, from the third set of UEs, the third set of perception data based on at least one of the configured second set of planned routes and time plans or the configured second set of embeddings centroids, such as described in connection with FIGS. 6 to 11. For example, as described in connection with 1122 of FIG. 11, the network entity 1102 may repeat one or more steps above (e.g., steps described in connection with 1110 to 1120) until sufficient perception data are collected or specified mission(s) are met. As such, the network entity 1102 may continue to update and change planned/proposed routes for different UEs (e.g., vehicles) based on time evolving specifications. For example, the network entity 1102 may configure, for a third set of UEs in the UE pool (e.g., which may have UEs overlapped/non-overlapped with the first set of UEs 1104 and/or the second set of UEs 1106) based on the perception data received from the second set of UEs at 1116, another set of planned routes and time plans for collecting additional perception data and/or embeddings centroids. Similarly, the network entity 1102 may receive, from the third set of UEs, the additional perception data based on the configured set of planned routes and time plans and/or the configured set of embeddings centroids. The configuration of the at least one of: the second set of planned routes and time plans for collecting the third set of perception data or the second set of embeddings centroids and/or the reception of the third set of perception data may be performed by, e.g., the trajectory planning component 199, the network processor(s) 1412, and/or the network interface 1480 of the network entity 1460 in FIG. 14.

In another example, the first set of perception data may be based on a set of centroids representing distribution of features of the first set of perception data.

In another example, the first set of UEs may at least partially overlap with the second set of UEs.

In another example, the first set of perception data or the second set of perception data may include at least one of: a set of images captured by at least one camera, or a set of point clouds captured or generated by at least one radar.

In another example, the network entity may annotate the second set of perception data.

Figure 14:
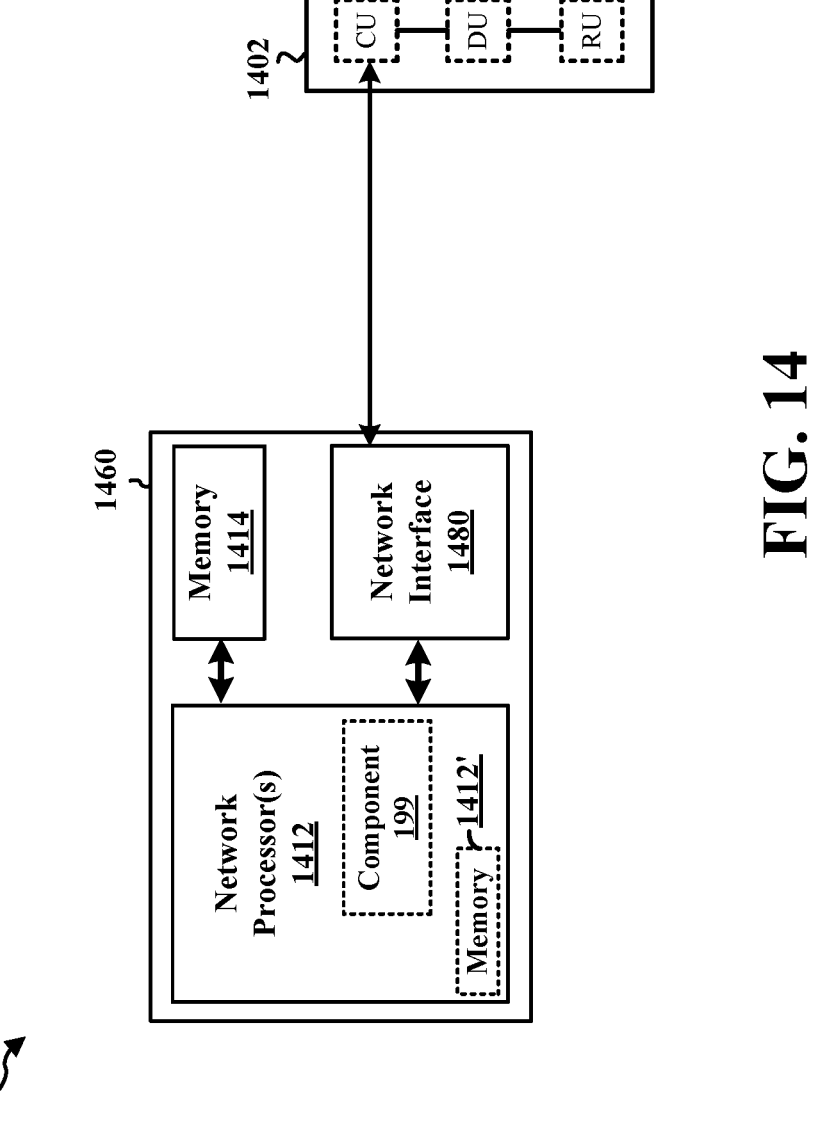
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include at least one network processor 1412. The network processor(s) 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/ memory. Each computer-readable medium/memory may be non-transitory. The network processor(s) 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the trajectory planning component 199 may be configured to receive, from a first set of user equipments (UEs), a first set of perception data collected by the first set of UEs. The trajectory planning component 199 may also be configured to configure, for a second set of UEs based on the first set of perception data, at least one of: a set of planned routes and time plans for collecting a second set of perception data or a set of embeddings centroids. The trajectory planning component 199 may also be configured to receive, from the second set of UEs, the second set of perception data based on at least one of the configured set of planned routes and time plans or the configured set of embeddings centroids. The trajectory planning component 199 may be within the network processor(s) 1412. The trajectory planning component 199 may be one or more hardware components specifically configured to carry out the stated processes/algorithm, implemented by one or more processors configured to perform the stated processes/algo- rithm, stored within a computer-readable medium for imple- mentation by one or more processors, or some combination thereof. When multiple processors are implemented, the multiple processors may perform the stated processes/algo- rithm individually or in combination. The network entity 1460 may include a variety of components configured for various functions. In one configuration, the network entity 1460 may include means for receiving, from a first set of UEs, a first set of perception data collected by the first set of UEs. The network entity 1460 may further include means for configuring, for a second set of UEs based on the first set of perception data, at least one of: a set of planned routes and time plans for collecting a second set of perception data or a set of embeddings centroids. The network entity 1460 may further include means for receiving, from the second set of UEs, the second set of perception data based on at least one of the configured set of planned routes and time plans or the configured set of embeddings centroids.

In one configuration, the means for configuring the set of planned routes and time plans for collecting the second set of perception data may include configuring the network entity 1460 to evaluate a difference between the first set of perception data and a set of existing perception data in a perception dataset, determine the set of planned routes and time plans for collecting the second set of perception data based on the evaluated difference, and transmit the set of planned routes and time plans to the second set of UEs.

In another configuration, the means for configuring the set of planned routes and time plans for collecting the second set of perception data may include configuring the network entity 1460 to obtain information related to at least one of: data specified for a perception dataset, existing trajectory data, or a cost constraint, determine the set of planned routes and time plans for collecting the second set of perception data based on the information, and transmit the set of planned routes and time plans to the second set of UEs.

In another configuration, the means for configuring the set of planned routes and time plans for collecting the second set of perception data may include configuring the network entity 1460 to obtain an indication of an attribute distribution, determine the set of planned routes and time plans for collecting the second set of perception data based on the indication, map data, and traffic information, and transmit the set of planned routes and time plans to the second set of UEs.

In another configuration, the means for receiving, from the second set of UEs, the second set of perception data based on the configured set of planned routes and time plans may include configuring the network entity 1460 to receive, from each UE in the second set of UEs, an indication of a portion of the configured set of planned routes and time plans travelled by each UE.

In another configuration, the network entity 1460 may further include means for configuring, for the second set of UEs based on the first set of perception data, a list of perception data to be filtered, where the reception of the second set of perception data is further based on the list of the perception data to be filtered.

In another configuration, the network entity 1460 may further include means for outputting, to a perception dataset, the first set of perception data and the second set of perception data, and means for receiving a set of annotated data based on the output of the first set of perception data and the second set of perception data.

In another configuration, the network entity 1460 may further include means for configuring, for a third set of UEs based on the second set of perception data, at least one of: a second set of planned routes and time plans for collecting a third set of perception data or a second set of embeddings centroids; and means for receiving, from the third set of UEs, the third set of perception data based on at least one of the configured second set of planned routes and time plans or the configured second set of embeddings centroids.

In another configuration, the first set of perception data may be based on a set of centroids representing distribution of features of the first set of perception data.

In another configuration, the first set of UEs may at least partially overlap with the second set of UEs.

In another configuration, the first set of perception data or the second set of perception data may include at least one of: a set of images captured by at least one camera, or a set of point clouds captured or generated by at least one radar.

In another configuration, the network entity 1460 may further include means for annotating the second set of perception data.

The means may be the trajectory planning component 199 of the network entity 1460 configured to perform the functions recited by the means.

FIG. 15 is a flowchart 1500 of a method of wireless communication (or object detection). The method may be performed by a UE (e.g., the UE 104; the set of vehicles 604; the vehicle 904, 1004; the first set of UEs 1104; the second set of UEs 1106; the apparatus 1704). The method may improve the efficiency of perception data collection and curation by enabling the UE to filter/select perception data to be uploaded based on a set of criteria.

At 1504, the UE may transmit, to a network entity, a first set of perception data collected by the UE, such as described in connection with FIGS. 6 to 11. For example, as discussed in connection with 1110 of FIG. 11, the first set of UEs 1104 may transmit, to the network entity 1102, a set of perception data collected by the first set of UEs 1104. The transmission of the first set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

At 1506, the UE may receive, from the network entity based on the first set of perception data, a configuration for at least one of: a set of planned routes and time plans for collecting a second set of perception data or a set of embeddings centroids, such as described in connection with FIGS. 6 to 11. For example, as discussed in connection with 1112 of FIG. 11, the second set of UEs 1106 (which may include UEs overlapping with the first set of UEs 1104) may receive, from the network entity 1102 based on the perception data collected by the first set of UEs 1104, a configuration for at least one of: a set of planned routes and time plans for collecting additional perception data or a set of embeddings centroids. The reception of the configuration may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

At 1508, the UE may collect the second set of perception data based on the configuration, such as described in connection with FIGS. 6 to 11. For example, as discussed in connection with 1114 of FIG. 11, the second set of UEs 1106 may collecting perception data based on the configuration. The collection of the second set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In one example, to collect the second set of perception data based on the configuration, the UE may be configured to obtain a set of embeddings from the second set of perception data, compare the set of embeddings with the set of embeddings centroids, and identify perception data for upload based on the comparison. In some implementations, to obtain the set of embeddings from the second set of perception data, the UE may be configured to perform a distance-based file sampling to obtain the set of embeddings from the second set of perception data.

In another example, the UE may select a third set of perception data from the second set of perception data collected based on the configuration or based on a set of criteria, and transmit, to the network entity, the selected third set of perception data.

In another example, the UE may receive, from the network entity, a list of perception data to be filtered, filter the second set of perception data based on the list, and transmit the filtered second set of perception data.

In another example, the UE may collect the first set of perception data based on a set of centroids representing distribution of features of the first set of perception data, such as described in connection with FIGS. 6 to 11. For example, as discussed in connection with 1012 of FIG. 10, the online file selector 620 of the vehicle 1004 may include an embeddings distance sampler 1006 that is configured to use the embeddings centroids allocator 616 to perform distance-based file sampling using embeddings (e.g., between embeddings of the new collect and the embedding centroids). For example, as shown at 1014, the goal of the embeddings distance sampler 1006 may be to find most relevant/interesting sample or perception data to keep, e.g., if a sample (e.g., sample 2) is located in a targeted cluster, then that sample may be worth or keeping and may help to increase dataset diversity compared to the sample that is further away from the targeted cluster (e.g., Sample 1). The collection of the first set of perception data based on a set of centroids may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, the UE may transmit, to the network entity, the second set of perception data, such as described in connection with FIGS. 6 to 11. For example, as discussed in connection with 1116 of FIG. 11, the second set of UEs 1106 may transmit, to the network entity 1102, the perception data collected based on the configuration received at 1112. The transmission of the second set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, the UE may transmit, to the network entity, an indication of a portion of the configured set of planned routes and time plans travelled by the UE, such as described in connection with FIGS. 6 to 11. For example, as discussed in connection with 1120 of FIG. 11, the second set of UEs 1106 may also transmit, to the network entity 1102, an indication of a portion of the configured set of planned routes and time plans travelled by the second set of UEs 1106 (e.g., by each UE in the second set of UEs 1106). The transmission of the indication may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, the UE may receive, from the network entity based on the second set of perception data, at least one of: a second set of planned routes and time plans for collecting a third set of perception data or a second set of embeddings centroids, collect the second set of perception data based on at least one of the configured second set of planned routes and time plans or the configured second set of embeddings centroids, and transmit, to the network entity, the third set of perception data, such as described in connection with FIGS. 6 to 11. For example, as discussed in connection with 1122 of FIG. 11, the network entity 1102 may repeat one or more steps above (e.g., steps described in connection with 1110 to 1120) until sufficient perception data are collected or specified mission(s) are met. As such, the network entity 1102 may continue to update and change planned/proposed routes for different UEs (e.g., vehicles) based on time evolving specifications. For example, the network entity 1102 may configure, for a third set of UEs in the UE pool (e.g., which may have UEs overlapped/non-overlapped with the first set of UEs 1104 and/or the second set of UEs 1106) based on the perception data received from the second set of UEs at 1116, another set of planned routes and time plans for collecting additional perception data and/or embeddings centroids. Similarly, the network entity 1102 may receive, from the third set of UEs, the additional perception data based on the configured set of planned routes and time plans and/or the configured set of embeddings centroids. In other words, the third set of UEs may receive, from the network entity 1102 based on the perception data from the second set of UEs 1106, at least one of: another set of planned routes and time plans for collecting additional perception data or another set of embeddings centroids, collect perception data based on at least one of the configured set of planned routes and time plans or the set of embeddings centroids, and transmit, to the network entity 1102, the additional perception data collected. The reception of the second set of planned routes and time plans for collecting the third set of perception data or the second set of embeddings centroids, the collection of the second set of perception data, and/or the transmission of the third set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, the first set of perception data or the second set of perception data includes at least one of: a set of images captured by at least one camera, or a set of point clouds captured or generated by at least one radar.

In another example, the UE may evaluate whether each perception data in the second set of perception data is informative based on an active learning loop, and transmit, to the network entity, the perception data in the second set of perception data that is evaluated to be informative.

FIG. 16 is a flowchart 1600 of a method of wireless communication (or object detection). The method may be performed by a UE (e.g., the UE 104; the set of vehicles 604; the vehicle 904, 1004; the first set of UEs 1104; the second set of UEs 1106; the apparatus 1704). The method may improve the efficiency of perception data collection and curation by enabling the UE to filter/select perception data to be uploaded based on a set of criteria.

At 1604, the UE may transmit, to a network entity, a first set of perception data collected by the UE, such as described in connection with FIGS. 6 to 11. For example, as discussed in connection with 1110 of FIG. 11, the first set of UEs 1104 may transmit, to the network entity 1102, a set of perception data collected by the first set of UEs 1104. The transmission of the first set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

At 1606, the UE may receive, from the network entity based on the first set of perception data, a configuration for at least one of: a set of planned routes and time plans for collecting a second set of perception data or a set of embeddings centroids, such as described in connection with FIGS. 6 to 11. For example, as discussed in connection with 1112 of FIG. 11, the second set of UEs 1106 (which may include UEs overlapping with the first set of UEs 1104) may receive, from the network entity 1102 based on the perception data collected by the first set of UEs 1104, a configuration for at least one of: a set of planned routes and time plans for collecting additional perception data or a set of embeddings centroids. The reception of the configuration may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

At 1608, the UE may collect the second set of perception data based on the configuration, such as described in connection with FIGS. 6 to 11. For example, as discussed in connection with 1114 of FIG. 11, the second set of UEs 1106 may collecting perception data based on the configuration. The collection of the second set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In one example, to collect the second set of perception data based on the configuration, the UE may be configured to obtain a set of embeddings from the second set of perception data, compare the set of embeddings with the set of embeddings centroids, and identify perception data for upload based on the comparison. In some implementations, to obtain the set of embeddings from the second set of perception data, the UE may be configured to perform a distance-based file sampling to obtain the set of embeddings from the second set of perception data.

In another example, the UE may select a third set of perception data from the second set of perception data collected based on the configuration or based on a set of criteria, and transmit, to the network entity, the selected third set of perception data.

In another example, the UE may receive, from the network entity, a list of perception data to be filtered, filter the second set of perception data based on the list, and transmit the filtered second set of perception data.

In another example, as shown at 1602, the UE may collect the first set of perception data based on a set of centroids representing distribution of features of the first set of perception data, such as described in connection with FIGS. 6 to 11. For example, as discussed in connection with 1012 of FIG. 10, the online file selector 620 of the vehicle 1004 may include an embeddings distance sampler 1006 that is configured to use the embeddings centroids allocator 616 to perform distance-based file sampling using embeddings (e.g., between embeddings of the new collect and the embedding centroids). For example, as shown at 1014, the goal of the embeddings distance sampler 1006 may be to find most relevant/interesting sample or perception data to keep, e.g., if a sample (e.g., sample 2) is located in a targeted cluster, then that sample may be worth or keeping and may help to increase dataset diversity compared to the sample that is further away from the targeted cluster (e.g., Sample 1). The collection of the first set of perception data based on a set of centroids may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, as shown at 1610, the UE may transmit, to the network entity, the second set of perception data, such as described in connection with FIGS. 6 to 11. For example, as discussed in connection with 1116 of FIG. 11, the second set of UEs 1106 may transmit, to the network entity 1102, the perception data collected based on the configuration received at 1112. The transmission of the second set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, as shown at 1612, the UE may transmit, to the network entity, an indication of a portion of the configured set of planned routes and time plans travelled by the UE, such as described in connection with FIGS. 6 to 11. For example, as discussed in connection with 1120 of FIG. 11, the second set of UEs 1106 may also transmit, to the network entity 1102, an indication of a portion of the configured set of planned routes and time plans travelled by the second set of UEs 1106 (e.g., by each UE in the second set of UEs 1106). The transmission of the indication may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, as shown at 1614, the UE may receive, from the network entity based on the second set of perception data, at least one of: a second set of planned routes and time plans for collecting a third set of perception data or a second set of embeddings centroids, collect the second set of perception data based on at least one of the configured second set of planned routes and time plans or the configured second set of embeddings centroids, and transmit, to the network entity, the third set of perception data, such as described in connection with FIGS. 6 to 11. For example, as discussed in connection with 1122 of FIG. 11, the network entity 1102 may repeat one or more steps above (e.g., steps described in connection with 1110 to 1120) until sufficient perception data are collected or specified mission (s) are met. As such, the network entity 1102 may continue to update and change planned/proposed routes for different UEs (e.g., vehicles) based on time evolving specifications. For example, the network entity 1102 may configure, for a third set of UEs in the UE pool (e.g., which may have UEs overlapped/non-overlapped with the first set of UEs 1104 and/or the second set of UEs 1106) based on the perception data received from the second set of UEs at 1116, another set of planned routes and time plans for collecting additional perception data and/or embeddings centroids. Similarly, the network entity 1102 may receive, from the third set of UEs, the additional perception data based on the configured set of planned routes and time plans and/or the configured set of embeddings centroids. In other words, the third set of UEs may receive, from the network entity 1102 based on the perception data from the second set of UEs 1106, at least one of: another set of planned routes and time plans for collecting additional perception data or another set of embeddings centroids, collect perception data based on at least one of the configured set of planned routes and time plans or the set of embeddings centroids, and transmit, to the network entity 1102, the additional perception data collected. The reception of the second set of planned routes and time plans for collecting the third set of perception data or the second set of embeddings centroids, the collection of the second set of perception data, and/or the transmission of the third set of perception data may be performed by, e.g., the perception data collection component 198, the camera 1732, the one or more sensors 1718, the transceiver(s) 1722, the cellular baseband processor(s) 1724, and/or the application processor(s) 1706 of the apparatus 1704 in FIG. 17.

In another example, the first set of perception data or the second set of perception data includes at least one of: a set of images captured by at least one camera, or a set of point clouds captured or generated by at least one radar.

In another example, the UE may evaluate whether each perception data in the second set of perception data is informative based on an active learning loop, and transmit, to the network entity, the perception data in the second set of perception data that is evaluated to be informative.

Figure 17:
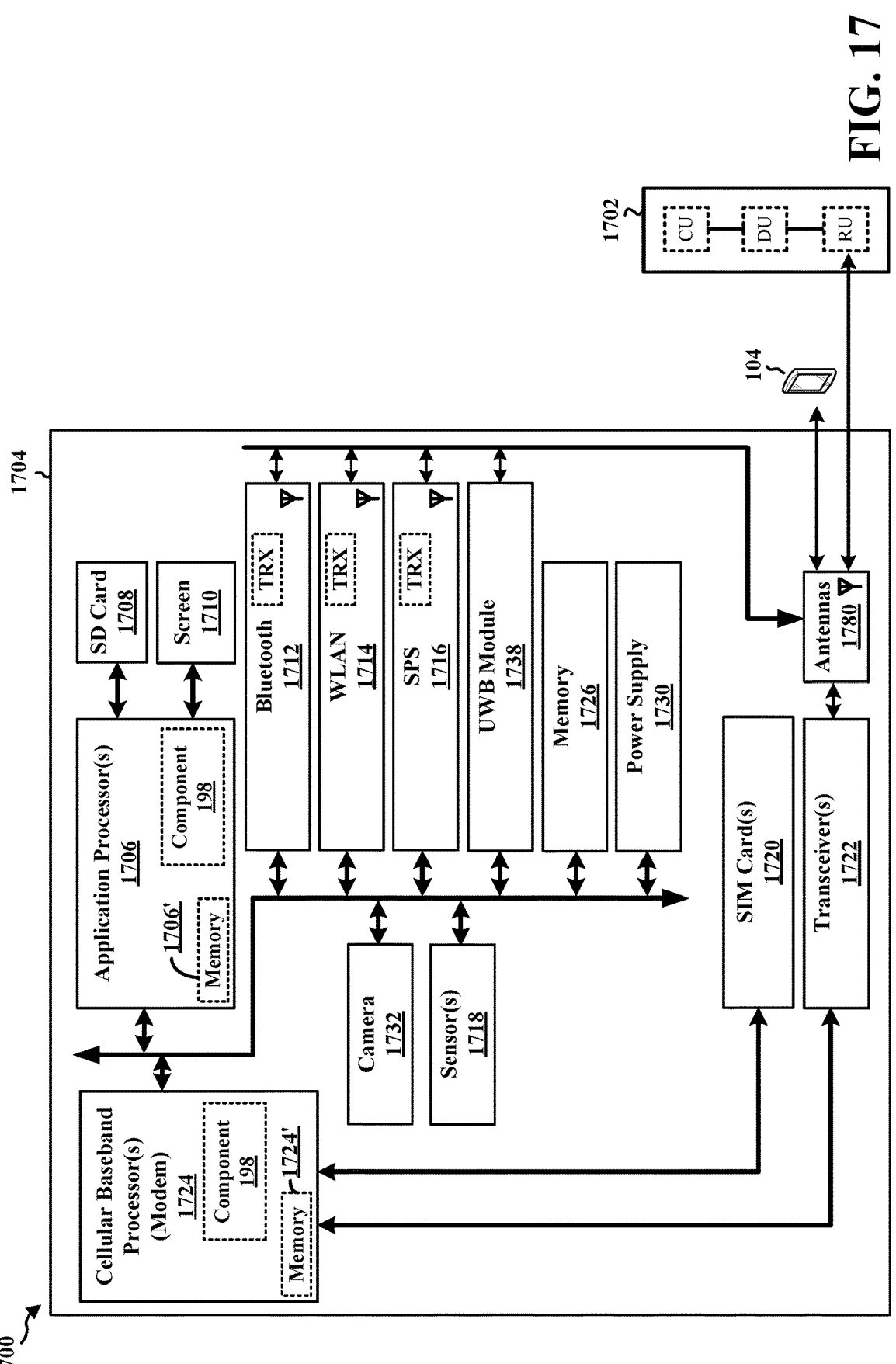
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an ultrawide band (UWB) module 1738, an SPS module 1716 (e.g., GNSS module), one or more sensors 1718 (e.g., barometric pressure sensor/altimeter; motion sensor such as inertial measurement unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the UWB module 1738, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The cellular baseband processor(s) 1724 and the application processor(s) 1706 are configured to perform the various functions described supra based at least in part of the information stored in the memory. That is, the cellular baseband processor(s) 1724 and the application processor(s) 1706 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the perception data collection component 198 may be configured to transmit, to a network entity, a first set of perception data collected by the UE. The perception data collection component 198 may also be configured receive, from the network entity based on the first set of perception data, a configuration for at least one of: a set of planned routes and time plans for collecting a second set of perception data or a set of embeddings centroids. The perception data collection component 198 may also be configured to collect the second set of perception data based on the configuration. The perception data collection component 198 may be within the cellular baseband processor(s) 1724, the application processor(s) 1706, or both the cellular baseband processor(s) 1724 and the application processor(s) 1706. The perception data collection component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for transmitting, to a network entity, a first set of perception data collected by the UE. The apparatus 1704 may further include means for receiving, from the network entity based on the first set of perception data, a configuration for at least one of: a set of planned routes and time plans for collecting a second set of perception data or a set of embeddings centroids. The apparatus 1704 may further include means for collecting the second set of perception data based on the configuration.

In one configuration, the means for collecting the second set of perception data based on the configuration may include configuring the apparatus 1704 to obtain a set of embeddings from the second set of perception data, compare the set of embeddings with the set of embeddings centroids, and identify perception data for upload based on the comparison. In some implementations, to obtain the set of embeddings from the second set of perception data, the apparatus 1704 may be configured to perform a distance-based file sampling to obtain the set of embeddings from the second set of perception data.

In another configuration, the apparatus 1704 may further include means for selecting a third set of perception data from the second set of perception data collected based on the configuration or based on a set of criteria, and means for transmitting, to the network entity, the selected third set of perception data.

In another configuration, the apparatus 1704 may further include means for receiving, from the network entity, a list of perception data to be filtered, means for filtering the second set of perception data based on the list, and means for transmitting the filtered second set of perception data.

In another configuration, the apparatus 1704 may further include means for collecting the first set of perception data based on a set of centroids representing distribution of features of the first set of perception data.

In another configuration, the apparatus 1704 may further include means for transmitting, to the network entity, the second set of perception data.

In another configuration, the apparatus 1704 may further include means for transmitting, to the network entity, an indication of a portion of the configured set of planned routes and time plans travelled by the UE.

In another configuration, the apparatus 1704 may further include means for receiving, from the network entity based on the second set of perception data, at least one of: a second set of planned routes and time plans for collecting a third set of perception data or a second set of embeddings centroids, means for collecting the second set of perception data based on at least one of the configured second set of planned routes and time plans or the configured second set of embeddings centroids, and means for transmitting, to the network entity, the third set of perception data.

In another configuration, the first set of perception data or the second set of perception data includes at least one of: a set of images captured by at least one camera, or a set of point clouds captured or generated by at least one radar.

In another configuration, the apparatus 1704 may further include means for evaluating whether each perception data in the second set of perception data is informative based on an active learning loop, and means for transmitting, to the network entity, the perception data in the second set of perception data that is evaluated to be informative.

The means may be the perception data collection component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising: receiving, from a first set of user equipments (UEs), a first set of perception data collected by the first set of UEs; configuring, for a second set of UEs based on the first set of perception data, at least one of: a set of planned routes and time plans for collecting a second set of perception data or a set of embeddings centroids; and receiving, from the second set of UEs, the second set of perception data based on at least one of the configured set of planned routes and time plans or the configured set of embeddings centroids.

Aspect 2 is the method of aspect 1, wherein configuring the set of planned routes and time plans for collecting the second set of perception data comprises: evaluating a difference between the first set of perception data and a set of existing perception data in a perception dataset; determining the set of planned routes and time plans for collecting the second set of perception data based on the evaluated difference; and transmitting the set of planned routes and time plans to the second set of UEs.

Aspect 3 is the method of aspect 1 or aspect 2, wherein configuring the set of planned routes and time plans for collecting the second set of perception data comprises: obtaining information related to at least one of: data specified for a perception dataset, existing trajectory data, or a cost constraint; determining the set of planned routes and time plans for collecting the second set of perception data based on the information; and transmitting the set of planned routes and time plans to the second set of UEs.

Aspect 4 is the method of any of aspects 1 to 3, wherein configuring the set of planned routes and time plans for collecting the second set of perception data comprises: obtaining an indication of an attribute distribution; determining the set of planned routes and time plans for collecting the second set of perception data based on the indication, map data, and traffic information; and transmitting the set of planned routes and time plans to the second set of UEs.

Aspect 5 is the method of any of aspects 1 to 4, further comprising: configuring, for the second set of UEs based on the first set of perception data, a list of perception data to be filtered, wherein the reception of the second set of perception data is further based on the list of the perception data to be filtered.

Aspect 6 is the method of any of aspects 1 to 5, wherein receiving, from the second set of UEs, the second set of perception data based on the configured set of planned routes and time plans further comprises: receiving, from each UE in the second set of UEs, an indication of a portion of the configured set of planned routes and time plans travelled by each UE.

Aspect 7 is the method of any of aspects 1 to 6, further comprising: configuring, for a third set of UEs based on the second set of perception data, at least one of: a second set of planned routes and time plans for collecting a third set of perception data or a second set of embeddings centroids; and receiving, from the third set of UEs, the third set of perception data based on at least one of the configured second set of planned routes and time plans or the configured second set of embeddings centroids.

Aspect 8 is the method of any of aspects 1 to 7, wherein the first set of perception data is based on a set of centroids representing distribution of features of the first set of perception data.

Aspect 9 is the method of any of aspects 1 to 8, wherein the first set of UEs at least partially overlaps with the second set of UEs.

Aspect 10 is the method of any of aspects 1 to 9, wherein the first set of perception data or the second set of perception data includes at least one of: a set of images captured by at least one camera, or a set of point clouds captured or generated by at least one radar.

Aspect 11 is the method of any of aspects 1 to 10, further comprising: outputting, to a perception dataset, the first set of perception data and the second set of perception data, and receiving a set of annotated data based on the output of the first set of perception data and the second set of perception data.

Aspect 12 is the method of any of aspects 1 to 11, further comprising: annotating the second set of perception data.

Aspect 13 is an apparatus for wireless communication at a network entity, including: at least one memory; and at least one processor coupled to the at least one memory and, based at least in part on information stored in the at least one memory, the at least one processor, individually or in any combination, is configured to implement any of aspects 1 to 12.

Aspect 14 is the apparatus of aspect 13, further including at least one camera coupled to the at least one processor.

Aspect 15 is an apparatus for wireless communication at a network entity including means for implementing any of aspects 1 to 12.

Aspect 16 is a computer-readable medium (e.g., a non-transitory computer-readable medium) storing computer executable code, where the code when executed by a processor causes the processor to implement any of aspects 1 to 12.

Aspect 17 is a method of wireless communication at a user equipment (UE), comprising: transmitting, to a network entity, a first set of perception data collected by the UE; receiving, from the network entity based on the first set of perception data, a configuration for at least one of: a set of planned routes and time plans for collecting a second set of perception data or a set of embeddings centroids; and collecting the second set of perception data based on the configuration.

Aspect 18 is the method of aspect 17, further comprising: transmitting, to the network entity, the second set of perception data.

Aspect 19 is the method of aspect 17 or aspect 18, further comprising: receiving, from the network entity based on the second set of perception data, at least one of: a second set of planned routes and time plans for collecting a third set of perception data or a second set of embeddings centroids; collecting the second set of perception data based on at least one of the configured second set of planned routes and time plans or the configured second set of embeddings centroids; and transmitting, to the network entity, the third set of perception data.

Aspect 20 is the method of any of aspects 17 to 19, wherein collecting the second set of perception data based on the configuration comprises: obtaining a set of embeddings from the second set of perception data; comparing the set of embeddings with the set of embeddings centroids; and identifying perception data for upload based on the comparison.

Aspect 21 is the method of any of aspects 17 to 20, wherein obtaining the set of embeddings from the second set of perception data comprises: performing a distance-based file sampling to obtain the set of embeddings from the second set of perception data.

Aspect 22 is the method of any of aspects 17 to 21, further comprising: selecting a third set of perception data from the second set of perception data collected based on the configuration or based on a set of criteria; and transmitting, to the network entity, the selected third set of perception data.

Aspect 23 is the method of any of aspects 17 to 22, further comprising: receiving, from the network entity, a list of perception data to be filtered; filtering the second set of perception data based on the list; and transmitting the filtered second set of perception data.

Aspect 24 is the method of any of aspects 17 to 23, further comprising: transmitting, to the network entity, an indication of a portion of the configured set of planned routes and time plans travelled by the UE.

Aspect 25 is the method of any of aspects 17 to 24, wherein the first set of perception data or the second set of perception data includes at least one of: a set of images captured by at least one camera, or a set of point clouds captured or generated by at least one radar.

Aspect 26 is the method of any of aspects 17 to 25, further comprising: evaluating whether each perception data in the second set of perception data is informative based on an active learning loop; and transmitting, to the network entity, the perception data in the second set of perception data that is evaluated to be informative.

Aspect 27 is the method of any of aspects 17 to 26, further comprising: collecting the first set of perception data based on a set of centroids representing distribution of features of the first set of perception data.

Aspect 28 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 17 to 27.

Aspect 29 is the apparatus of aspect 28, further including at least one camera coupled to the at least one processor.

Aspect 30 is an apparatus for wireless communication at a user equipment (UE) including means for implementing any of aspects 17 to 27.

Aspect 31 is a computer-readable medium (e.g., a non-transitory computer-readable medium) storing computer executable code, where the code when executed by a processor causes the processor to implement any of aspects 17 to 27.

What is claimed is:

1. An apparatus for wireless communication at a network entity, comprising: at least one network interface; at least one memory; and at least one processor coupled to the at least one network interface and the at least one memory, the at least one processor, is configured to:
  receive, from a first set of user equipments (UEs), a first set of perception data collected by the first set of UEs;
  configure, for a second set of UEs based on the first set of perception data, a set of planned routes and time plans for collecting a second set of perception data;
  transmit, to the second set of UEs via the at least one network interface, the configured set of planned routes and time plans; and receive, from the second set of UEs via the at least one network interface, the second set of perception data based on at least one of the configured set of planned routes and time plans, wherein the second set of perception data is collected using a navigation route that differs from an optimal or quickest route to a destination.

2. The apparatus of claim 1, wherein to configure the set of planned routes and time plans for collecting the second set of perception data, the at least one processor is configured to:
  evaluate a difference between the first set of perception data and a set of existing perception data in a perception dataset; and
  determine the set of planned routes and time plans for collecting the second set of perception data based on the evaluated difference.

3. The apparatus of claim 1, wherein to configure the set of planned routes and time plans for collecting the second set of perception data, the at least one processor is configured to:
  obtain information related to at least one of: data specified for a perception dataset, existing trajectory data, or a cost constraint; and
  determine the set of planned routes and time plans for collecting the second set of perception data based on the information.

4. The apparatus of claim 1, wherein to configure the set of planned routes and time plans for collecting the second set of perception data, the at least one processor is configured to:
  obtain an indication of an attribute distribution; and
  determine the set of planned routes and time plans for collecting the second set of perception data based on the indication, map data, and traffic information.

5. The apparatus of claim 1, wherein the at least one processor is further configured to:
  configure, for the second set of UEs based on the first set of perception data, a list of perception data to be filtered, wherein the reception of the second set of perception data is further based on the list of the perception data to be filtered.

6. The apparatus of claim 1, wherein to receive, from the second set of UEs, the second set of perception data based on the configured set of planned routes and time plans, the at least one processor is configured to:
  receive, from each UE in the second set of UEs, an indication of a portion of the configured set of planned routes and time plans travelled by each UE.

7. The apparatus of claim 1, wherein the at least one processor is further configured to:
  configure, for a third set of UEs based on the second set of perception data, a second set of planned routes and time plans for collecting a third set of perception data; and
  receive, from the third set of UEs, the third set of perception data based on at least one of the configured second set of planned routes and time plans.

8. The apparatus of claim 1, wherein the first set of UEs at least partially overlaps with the second set of UEs.

9. The apparatus of claim 1, wherein the first set of perception data or the second set of perception data includes at least one of:
  a set of images captured by at least one camera, or
  a set of point clouds captured or generated by at least one radar.

10. The apparatus of claim 1, wherein the at least one processor is further configured to:

output, to a perception dataset, the first set of perception data and the second set of perception data, and receive a set of annotated data based on the output of the first set of perception data and the second set of perception data.

11. A method of wireless communication at a network entity, comprising:

receiving, from a first set of user equipments (UEs), a first set of perception data collected by the first set of UEs;

configuring, for a second set of UEs based on the first set of perception data, a set of planned routes and time plans for collecting a second set of perception data;

transmitting, to the second set of UEs via at least one network interface, the configured set of planned routes and time plans; and receiving, from the second set of UEs via the at least one network interface, the second set of perception data based on the configured set of planned routes and time plans, wherein the second set of perception data is collected using a navigation route that differs from an optimal or quickest route to a destination.

12. The method of claim 11, wherein configuring the set of planned routes and time plans for collecting the second set of perception data comprises:

evaluating a difference between the first set of perception data and a set of existing perception data in a perception dataset; and determining the set of planned routes and time plans for collecting the second set of perception data based on the evaluated difference.

13. The method of claim 11, wherein configuring the set of planned routes and time plans for collecting the second set of perception data comprises:

obtaining information related to at least one of: data specified for a perception dataset, existing trajectory data, or a cost constraint; and determining the set of planned routes and time plans for collecting the second set of perception data based on the information.

14. The method of claim 11, wherein configuring the set of planned routes and time plans for collecting the second set of perception data comprises:

obtaining an indication of an attribute distribution; and determining the set of planned routes and time plans for collecting the second set of perception data based on the indication, map data, and traffic information.

15. The method of claim 11, further comprising:

configuring, for the second set of UEs based on the first set of perception data, a list of perception data to be filtered, wherein the reception of the second set of perception data is further based on the list of the perception data to be filtered.

16. An apparatus for wireless communication at a user equipment (UE), comprising:

at least one transceiver;

at least one memory; and at least one processor coupled to the at least one transceiver and the at least one memory, the at least one processor is configured to:

transmit, to a network entity via the at least one transceiver, a first set of perception data collected by the UE;

receive, from the network entity based on the first set of perception data and via the at least one transceiver, a configuration for a set of planned routes and time plans for collecting a second set of perception data;

plan, based on the configuration, a navigation route to a destination that overlaps with at least a portion of the set of planned routes and time plans; and collect the second set of perception data while travelling through at least the portion of the set of planned routes and time plans based on the navigation route.

17. The apparatus of claim 16, wherein the at least one processor is further configured to:

transmit, to the network entity via the at least one transceiver, the second set of perception data.

18. The apparatus of claim 16, wherein to collect the second set of perception data based on the configuration, the at least one processor is configured to:

obtain a set of embeddings from the second set of perception data;

compare the set of embeddings with a set of embeddings centroids; and identify perception data for upload based on the comparison.

19. The apparatus of claim 16, wherein the at least one processor is further configured to:

receive, from the network entity, a list of perception data to be filtered;

filter the second set of perception data based on the list; and transmit the filtered second set of perception data.

20. The apparatus of claim 16, wherein the at least one processor is further configured to:

transmit, to the network entity, an indication of a portion of the configured set of planned routes and time plans travelled by the UE.

21. The apparatus of claim 16, wherein the first set of perception data or the second set of perception data includes at least one of:

a set of images captured by at least one camera, or a set of point clouds captured or generated by at least one radar.

22. The apparatus of claim 16, wherein the at least one processor is further configured to:

evaluate whether each perception data in the second set of perception data is informative based on an active learning loop; and transmit, to the network entity, the perception data in the second set of perception data that is evaluated to be informative.

23. The apparatus of claim 16, wherein the at least one processor is further configured to:

collect the first set of perception data based on a set of centroids representing distribution of features of the first set of perception data.

24. A method of wireless communication at a user equipment (UE), comprising:

transmitting, to a network entity via at least one transceiver, a first set of perception data collected by the UE;

receiving, from the network entity based on the first set of perception data and via the at least one transceiver, a configuration for a set of planned routes and time plans for collecting a second set of perception data;

plan, based on the configuration, a navigation route to a destination that overlaps with at least a portion of the set of planned routes and time plans; and collecting the second set of perception data while travelling through at least the portion of the set of planned routes and time plans based on the navigation route.

25. The method of claim 24, further comprising:

transmitting, to the network entity via the at least one transceiver, the second set of perception data.

26. The method of claim 24, wherein collecting the second set of perception data based on the configuration comprises:

obtaining a set of embeddings from the second set of perception data;

comparing the set of embeddings with a set of embeddings centroids; and identifying perception data for upload based on the comparison.

27. The method of claim 24, further comprising:

receiving, from the network entity, a list of perception data to be filtered;

filtering the second set of perception data based on the list; and transmitting the filtered second set of perception data.

28. The method of claim 24, further comprising:

transmitting, to the network entity, an indication of a portion of the configured set of planned routes and time plans travelled by the UE.

29. The method of claim 24, wherein the first set of perception data or the second set of perception data includes at least one of:

a set of images captured by at least one camera, or a set of point clouds captured or generated by at least one radar.

30. The method of claim 24, further comprising:

evaluating whether each perception data in the second set of perception data is informative based on an active learning loop; and transmitting, to the network entity, the perception data in the second set of perception data that is evaluated to be informative.

\* \* \* \* \*